United States Patent
Kim et al.

(10) Patent No.: US 9,477,353 B2
(45) Date of Patent: Oct. 25, 2016

(54) DISPLAY DEVICE INCLUDING TOUCH SENSOR

(71) Applicant: SAMSUNG DISPLAY CO., LTD., Gyeonggi-do (KR)

(72) Inventors: Chul Kim, Gyeonggi-do (KR); Ho Kyoon Kwon, Seoul (KR); Ki Seok Cha, Gyeonggi-do (KR); Seok-Hyun Jung, Chungcheongnam-do (KR); Ho Jin Byun, Gyeonggi-do (KR); Dae ho Song, Jeollabuk-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 374 days.

(21) Appl. No.: 13/651,550

(22) Filed: Oct. 15, 2012

(65) Prior Publication Data

US 2013/0335365 A1 Dec. 19, 2013

(30) Foreign Application Priority Data

Jun. 14, 2012 (KR) .................. 10-2012-0063511

(51) Int. Cl.
*G06F 3/041* (2006.01)
*G06F 3/045* (2006.01)
*G06F 3/044* (2006.01)

(52) U.S. Cl.
CPC ............. *G06F 3/044* (2013.01); *G06F 3/0412* (2013.01)

(58) Field of Classification Search
CPC .............................. G06F 3/044; G06F 3/0412
USPC .................................................. 345/173–174
See application file for complete search history.

(56) References Cited

U.S. PATENT DOCUMENTS

| | | |
|---|---|---|
| 2009/0079707 A1 | 3/2009 | Kaehler et al. |
| 2009/0096760 A1 | 4/2009 | Ma et al. |
| 2009/0167718 A1* | 7/2009 | Lee et al. ...................... 345/174 |
| 2010/0053112 A1 | 3/2010 | Chen |
| 2010/0066650 A1 | 3/2010 | Lee et al. |
| 2010/0194699 A1 | 8/2010 | Chang |

(Continued)

FOREIGN PATENT DOCUMENTS

| | | |
|---|---|---|
| KR | 1020100011571 | 2/2010 |
| KR | 1020110100377 | 9/2011 |

OTHER PUBLICATIONS

S. Tomita et al., "43.4: An In-Cell Capacitive Touch-Sensor Integrated in an LTPS WSVGA TFT-LCD", SID 11 Digest 2011, pp. 629-632.

*Primary Examiner* — Amit Chatly
(74) *Attorney, Agent, or Firm* — F. Chau & Associates, LLC

(57) ABSTRACT

A display device include a first surface, a sensing capacitor having a sensing input electrode and a sensing output electrode, wherein the sensing capacitor stores a first amount of charges and the sensing capacitor stored a second amount of charges when an external object contacts on the first surface, a sensing input signal line electrically connected with the sensing input electrode and receiving a sensing input signal to charge the sensing capacitor to the first amount of charges, a sensing output signal line electrically connected with the sensing output electrode, and a sensing signal processor connected with the sensing output signal line, wherein the sensing signal processor determines whether an external objects contact on the first surface based on a voltage difference between the first amount of charges and the second amount of charges stored in the sensing capacitor.

13 Claims, 26 Drawing Sheets

(56) References Cited

U.S. PATENT DOCUMENTS

| | | | |
|---|---|---|---|
| 2010/0253638 A1* | 10/2010 | Yousefpor et al. | 345/173 |
| 2010/0265207 A1* | 10/2010 | Chen | 345/174 |
| 2011/0012115 A1 | 1/2011 | Jeon et al. | |
| 2011/0090420 A1 | 4/2011 | Kim et al. | |
| 2011/0109568 A1 | 5/2011 | Wu et al. | |
| 2011/0115724 A1 | 5/2011 | Jeon et al. | |
| 2011/0122087 A1 | 5/2011 | Jang et al. | |
| 2011/0134076 A1 | 6/2011 | Kida et al. | |
| 2011/0157039 A1 | 6/2011 | Shin et al. | |
| 2011/0242047 A1* | 10/2011 | Kim et al. | 345/174 |
| 2011/0279763 A1 | 11/2011 | Cho et al. | |
| 2011/0310033 A1* | 12/2011 | Liu et al. | 345/173 |
| 2012/0086665 A1* | 4/2012 | Song | G02F 1/13338 345/174 |
| 2012/0274603 A1* | 11/2012 | Kim et al. | 345/174 |
| 2013/0106765 A1* | 5/2013 | Beecher | G06F 3/044 345/174 |

* cited by examiner

DISPLAY DEVICE INCLUDING TOUCH SENSOR

CROSS-REFERENCE TO RELATED APPLICATION

This application claims priority to and the benefit of Korean Patent Application No. 10-2012-0063511 filed in the Korean Intellectual Property Office on Jun. 14, 2012, the entire contents of which are incorporated herein by reference in its entirety.

TECHNICAL FIELD

The present invention relates to a display device including a touch sensor.

DISCUSSION OF THE RELATED ART

Recently, flat panel displays may include a capacitive touch sensor for providing a user interface in addition to the function of displaying an image. When the sensors are embedded in the display device, an aperture ratio and transmittance of the display device may be reduced due to an additional circuit configuration. In particular, as the display device becomes larger, related wirings travel longer and have higher resistance so that the sensors may not detect accurate contact information.

The above information disclosed in this Background section is only for enhancement of understanding of the background of the invention and therefore it may contain information that does not form the prior art that is already known in this country to a person of ordinary skill in the art.

SUMMARY OF THE INVENTION

In one embodiment according to the inventive concept, a display device include a first surface, a sensing capacitor having a sensing input electrode and a sensing output electrode, wherein the sensing capacitor stores a first amount of charges and the sensing capacitor stored a second amount of charges when an external object contacts on the first surface, a sensing input signal line electrically connected with the sensing input electrode and receiving a sensing input signal to charge the sensing capacitor to the first amount of charges, a sensing output signal line electrically connected with the sensing output electrode, and a sensing signal processor connected with the sensing output signal line, wherein the sensing signal processor determines whether an external objects contact on the first surface based on a voltage difference between the first amount of charges and the second amount of charges stored in the sensing capacitor.

In another embodiment, the display device may have the sensing input signal line having a lower resistance than the sensing input electrode, and the sensing output signal line having a lower resistance than the sensing output electrode. The display device further includes an insulating layer positioned on the sensing input electrode and the sensing output electrode, wherein the sensing input signal line is positioned on one side of the insulating layer and the sensing output signal line are positioned on the other side of the insulating layer. The sensing input signal line contacts the sensing input electrode and the sensing output signal line is connected to the sensing output electrode through a contact hole formed in the insulation layer. Alternatively, the sensing output signal line contacts the sensing output electrode and the sensing input signal line is connected to the sensing input electrode through a contact hole.

In still another embodiment, the display device further comprises a gate line transmitting a gate signal to a pixel and are positioned on the insulating layer, wherein the pixel emits light through the first surface, and wherein the gate line is adjacent to and substantially parallel to the sensing input signal line. At least one of the sensing input electrode and the sensing output electrode includes a thinner portion which overlaps with the gate line. The sensing input signal line contacts and is electrically connected to the thinner portion. Alternatively, the sensing input signal line comprises a plurality of sub input signal lines overlapping the sensing input electrode, wherein the sub input signal lines run substantially parallel to each other.

In still another embodiment, the display device includes at least one of the sensing output electrode and the sensing input electrode having a plurality of sensing electrodes arranged in a column direction and a connection part connecting adjacent sensing electrodes, wherein the connection part has a relatively smaller width than the sensing electrode.

In still another embodiment, the display device includes at least one of the sensing input electrode and the sensing output electrode including a metal having a mesh shape having an opening for transmitting light emitting from the pixel. The display device further includes a light blocking layer covering the sensing input electrode and the sensing output electrode. The display device further includes an anti-reflective layer positioned on at least one of the sensing input signal line, the sensing output signal line, the sensing input electrode and the sensing output electrode. The anti-reflective layer includes at least one of CuNx, TiOx and SiNx. The display device further includes a printed circuit board connected with a display panel having the pixel, the sensing capacitor, the sensing input signal line and the sensing output signal line through a printed circuit film, wherein the printed circuit film has a flat, rigid film.

In still another embodiment, the display device includes the sensing signal processor including a current integrator for measuring a voltage based on the first amount of charges and the second amount of charges stored in the sensing capacitor.

In still another embodiment, a display device comprises a first surface, a sensing capacitor having a sensing input electrode and a sensing output electrode, wherein the sensing capacitor stores a first amount of charges and the sensing capacitor stored a second amount of charges when an external object contacts on the first surface and wherein the sensing input electrode and the sensing output electrode are a mesh-shaped metal electrodes, each having an opening for transmitting light from a pixel to the first surface, and a sensing signal processor connected with the sensing output electrode, wherein the sensing signal processor determines where an external object contacts on the first surface based on a voltage difference between the first amount of charges and the second amount of charges stored in the sensing capacitor.

In still another embodiment, the display device further comprises a light blocking layer covering the sensing input electrode and the sensing output electrode. The display device further comprises an anti-reflective layer positioned on at least one of the sensing input electrode and the sensing output electrode. The anti-reflective layer includes at least one of CuNx, TiOx and SiNx.

In still another embodiment, the display device of claim 16 further comprises a sensing input signal line electrically connected with the sensing input electrode and transmitting the sensing input signal from a sensing scan driver to the sensing input electrode.

DETAILED DESCRIPTION OF THE EMBODIMENTS

Figure 1:
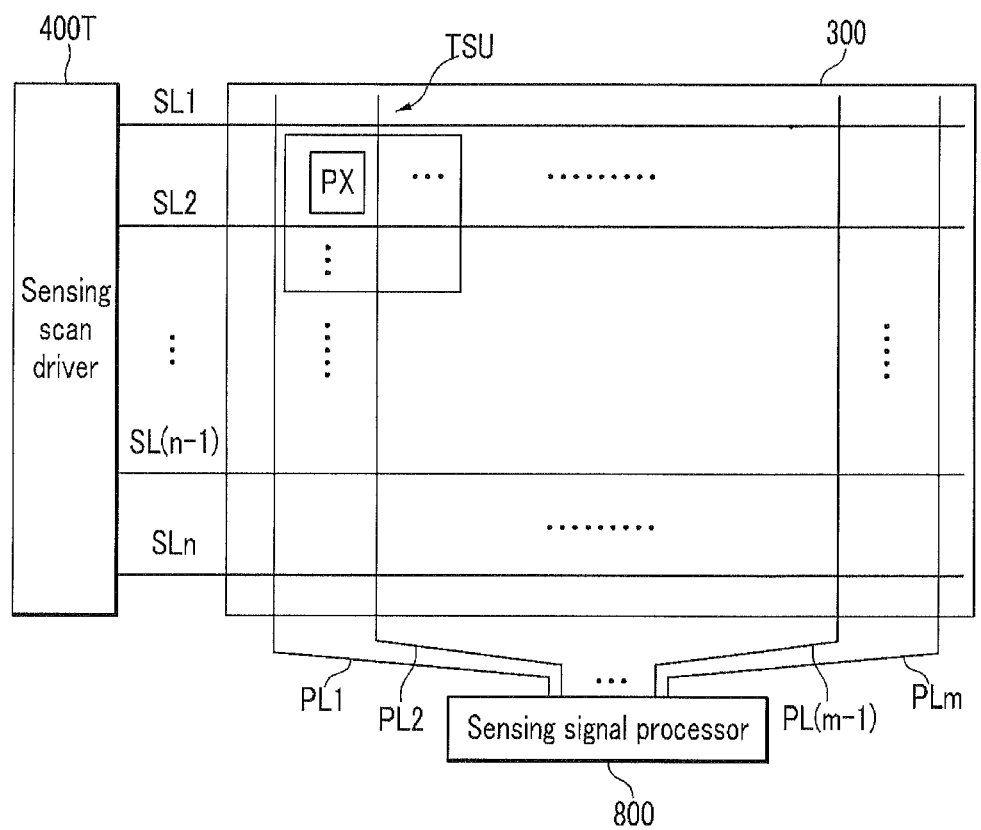
FIGS. 1, 2 and 3 are schematic layout views for illustrating a display device including a touch sensor according to an exemplary embodiment of the present invention, respectively.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Then, a display device including a touch sensor according to an exemplary embodiment of the present invention will be described with reference to FIGS. 1 to 5.

Figure 2:
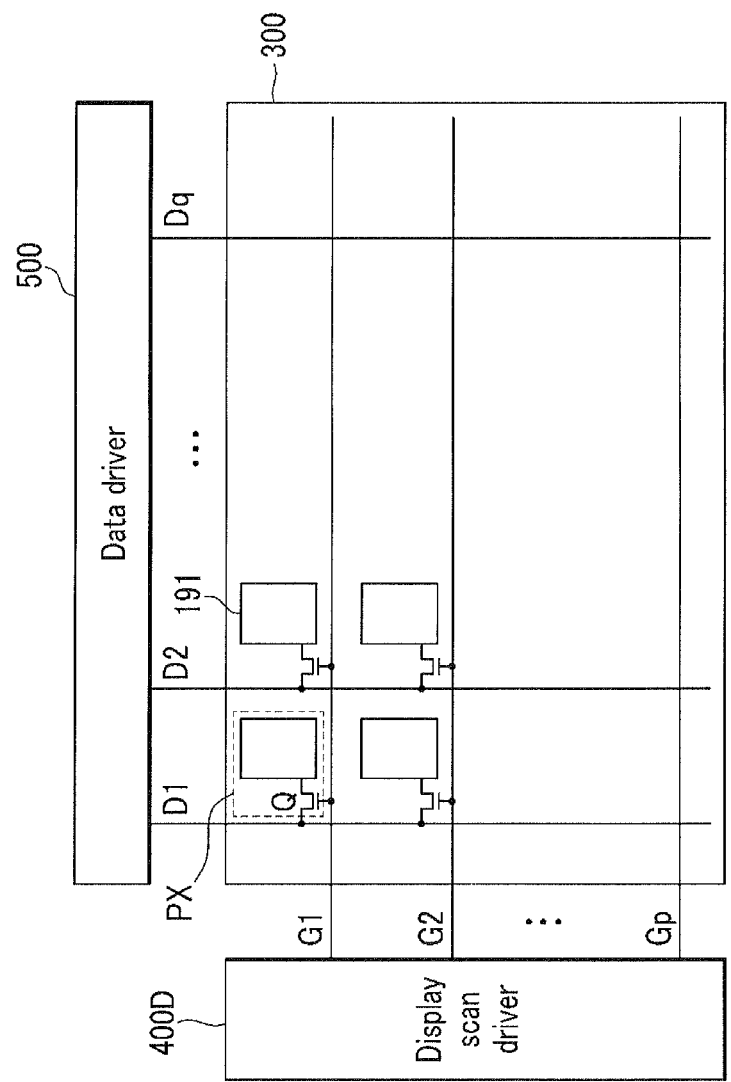
Figure 3:
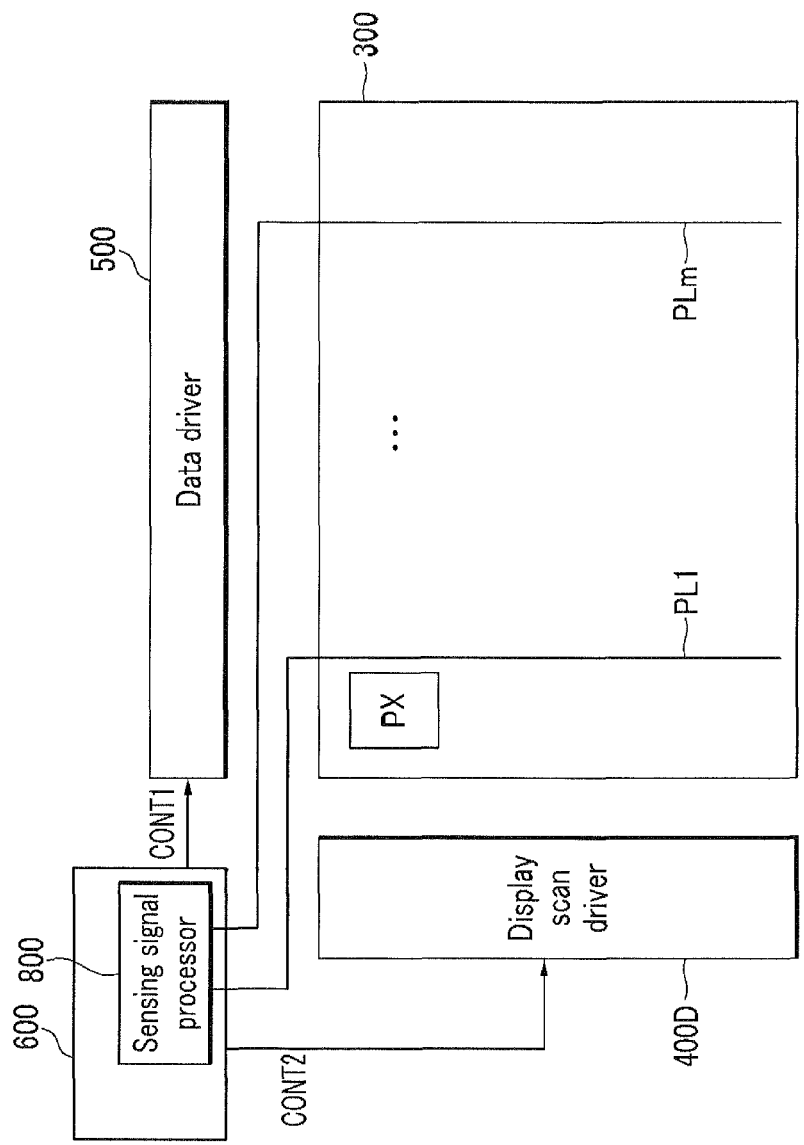
Figure 4:
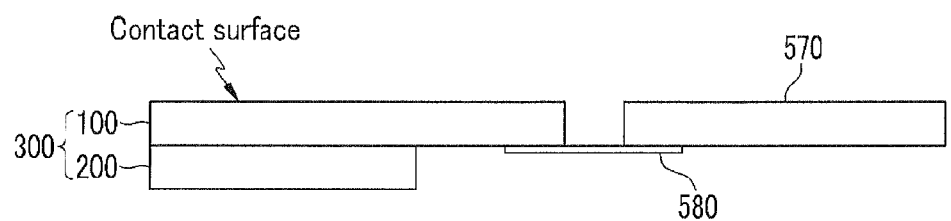
FIG. 4 is a cross-sectional view for illustrating the display device according to the exemplary embodiment of the present invention.
Figure 5:
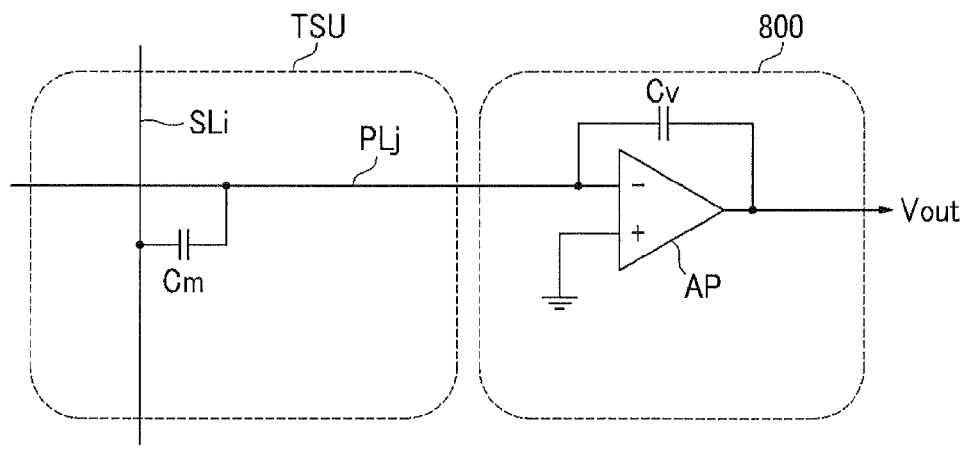
FIG. 5 is a circuit diagram for illustrating a touch sensor and a sensing signal processor included in the display device according to the exemplary embodiment of the present invention.

FIGS. 1, 2 and 3 are schematic layout for illustrating a display device including a touch sensor according to an exemplary embodiment of the present invention, respectively. FIG. 4 is a cross-sectional view of the display device according to the exemplary embodiment of the present invention. FIG. 5 is a circuit diagram of a touch sensor and a sensing signal processor included in the display device according to the exemplary embodiment of the present invention.

First, referring to FIG. 1, a display device including a touch sensor according to an exemplary embodiment of the present invention includes a display panel 300 including a touch sensor TSU, a sensing scan driver 400T, and a sensing signal processor 800. Further, referring to FIGS. 2 and 3, the display device including a touch sensor according to the exemplary embodiment of the present invention may further include a display scan driver 400D, a data driver 500, and a signal controller 600.

The display panel 300 includes a plurality of sensing input signal lines SL1, SL2, . . . , SLn (n is a natural number), a plurality of sensing output signal lines PL1, PL2, . . . , PLm (m is a natural number), a plurality of touch sensors TSU which are connected to the sensing input signal lines SL1, SL2, . . . , SLn and the sensing output signal lines PL1, PL2, . . . , PLm, and a plurality of pixels PX which display images and are arranged in a matrix form.

Meanwhile, referring to FIG. 2, the display panel 300 may further include a plurality of scanning signal lines G1, G2, . . . , Gp (p is a natural number) and a plurality of data lines D1, D2, . . . , Dq (q is a natural number). The plurality of pixels PX are connected to the scanning signal lines G1, G2, . . . , Gp and the data lines D1, D2, . . . , Dq.

The sensing input signal lines SL1, SL2, . . . , SLn are connected to the sensing scan driver 400T and may extend to be substantially parallel to each other. The sensing input signal lines SL1, SL2, . . . , SLn may transmit sensing input signals which are received from the sensing scan driver 400T.

The sensing inputs signals may have various waveforms and voltage levels. For example, the sensing input signals may include pulses which are periodically outputted, and may also include at least two different voltage levels. Further, the sensing input signals may also be AC voltages AC which are changed based on a predetermined voltage level.

The sensing output signal lines PL1, PL2, ..., PLm are connected with the sensing signal processor 800, cross the sensing input signal lines SL1, SL2, ..., SLn, and may extend to be substantially parallel to each other. Predetermined reference voltage may be applied to the sensing output signal lines PL1, PL2, ..., PLm, and the sensing output signal which is generated from the touch sensor TSU according to a touch on the display panel 300 may be transmitted to the sensing signal processor 800.

The scanning signal lines G1, G2, ..., Gp may connect to a plurality of switching elements Q, respectively, transmitting a gate signal that includes voltage levels of gate-on voltage Von and gate-off voltage Voff. For gate-on voltage Von, a switching element Q turns on and for gate-off voltage Voff, a switching element Q turns off. The scanning signal lines G1, G2, ..., Gp may extend to be substantially parallel to the sensing input signal lines SL1, SL2, ..., SLn.

The data lines D1, D2, ..., Dq may transmit data voltage and extend to be substantially parallel to the sensing output signal lines PL1, PL2, ..., PLm.

The pixel PX is a unit which displays an image, and one pixel PX uniquely displays one of primary colors (spatial division) or the plurality of pixels PX alternately display the primary colors according to a time (temporal division), such that a desired color may be displayed by a spatial or temporal sum of the primary colors.

Referring to FIG. 2, each pixel PX may include a switching element Q and a pixel electrode 191. For example, the switching element Q may be a thin film transistor. The transistor has a gate connected to one of the scanning signal lines G1, G2, ..., Gp and one of source/drain electrodes connected to one of the data lines D1, D2, ..., Dq, and the other electrode of source/drain electrode connected to a pixel electrode 191.

In one embodiment according to the inventive concept, a touch sensor TSU may be a capacitance type one, generation a sensing output signal in response to a contact on the touch sensor TSU. Referring to FIG. 1, a touch sensor TSU may locates at a crossing point between one of sensing input signal lines SL1, SL2, ..., SLn and one of sensing output signal lines PL1, PL2, ..., PLm, respectively. The touch sensor TSU may have various sizes according to contact areas that objects touch and form on the display panel 300. For example, the touch sensor TSU may have one side of substantially 4 to 5 mm.

Further, a touch sensor TSU may include a plurality of pixels PX. For example, dozens to hundreds of columns of pixel PX columns may be disposed in a row direction or column direction in the region of one touch sensor TSU. However, a touch sensor TSU may a density of the pixels PX not limited thereto and may have different number of columns of pixel PX according to resolution of the display device.

Referring to FIG. 5, one touch sensor TSU includes a sensing capacitor Cm formed between a sensing input signal line SLi (i=1, 2, ..., n) and a sensing output signal line PLj (j=1, 2, ..., m). The sensing capacitor Cm may include an overlap sensing capacitor which is configured by overlap of the sensing input signal line SLi and the sensing output signal line PLj, or a fringe sensing capacitor which is configured so that the sensing input signal line SLi and the sensing output signal line PLj are not overlapped with each other but adjacent to each other.

In operation, in response to a sensing input signal transmitted by the sensing input signal line SLi, the sensing capacitor Cm stores a predetermined amount of charges transmitted by the sensing input signal line SLi. In turn, when an external object contacts the touch sensor TSU, the charge amount stored in the sensing capacitor Cm may reduce, and the reduced amount of charge may be outputted to the sensing output signal line PLj as a sensing output signal, resulting in a voltage level smaller than that of a sensing output signal when an external object does not contact the display panel 300. The more a contact reduces the charge amount stored in the sensing capacitor Cm, the more sensitive the touch sensor TSU is because the sensing output signal transmit more charges. Accordingly, accuracy of contact information may increase.

Referring back to FIG. 1, the sensing scan driver 400T is connected with the sensing input signal lines SL1, SL2, ..., SLn of the display panel 300, applying the sensing input signals to the sensing input signal lines SL1, SL2, ..., SLn. In one embodiment, the sensing scan drive may sequentially apply sensing input signals to the sensing input signal lines SL1, SL2, ..., SLn, respectively.

The sensing signal processor 800 is connected with the sensing output signal lines PL1, PL2, ..., PLm of the display panel 300, receiving and processing sensing output signals from the touch sensor TSU through the sensing output signal lines PL1, PL2, ..., PLm. The sensing signal processor 800 may determine whether or not there is a contact and where a contact is made on the display panel 300.

Referring to FIG. 5, the sensing signal processor 800 may include a current integrator 810. The current integrator 810 includes an amplifier AP and a capacitor Cv. The amplifier AP has an inversion terminal connected with a sensing output signal line PLj and the other non-inversion terminal (+) connected with a predetermined voltage such as a ground GND. The capacitor Cv is connected between the inversion terminal (−) and an output terminal of the amplifier AP. In operation, the current integrator 810 may integrate currents of the sensing output signals from the sensing output signal lines PLj for a predetermined time, generating a sensing signal Vout. In one embodiment, the predetermined time may be a period of one frame.

The display scan driver 400D of FIG. 2 is connected to the scanning signal lines G1, G2, ..., Gp of the display panel 300, applying gate signals to the scanning signal lines G1, G2, ..., Gp, respectively.

Referring to FIG. 3, the data driver 500 is connected to the data lines D1, D2, ..., Dq of the display panel 300, applying data voltages corresponding to the input image signals to the data lines D1, D2, ..., Dq, respectively.

The signal controller 600 controls the display scan driver 400D and the data driver 500. The signal controller 600 receives an input image signal and an input control signal to generate an output image signal based thereon and generate a scan control signal CONT1 and a data control signal CONT2, and then transmits the scan control signal CONT1 to the display scan driver 400D and transmits the data control signal CONT2 and the output image signal to the data driver 500.

The sensing signal processor 800 may be included in the signal controller 600, but is not limited thereto and may also be provided to be separated from the signal controller 600.

Referring to FIG. 4, the display device according to the exemplary embodiment of the present invention may include the display panel 300, a printed circuit board 570 and a printed circuit film 580. The printed circuit board 570 may include the signal controller 600, some of the display scan driver 400D, the sensing scan driver 400T, the data driver 500, and the sensing signal processor 800.

The printed circuit board 570 may be connected with the lower panel 100 through a printed circuit film 580. The printed circuit film 580 may attach to a lower surface of the lower panel 100. The printed circuit film 580 may be flat, rigid enough to be bent under the weight of the printed circuit board 570 and the panels 100, 200, holding the lower panel 100 and the printed circuit board 570 each other on substantially the same plane. As described above, when the printed circuit film 580 is not bent, defect generation related to connection of the lower panel 100 and the printed circuit film 580 may be suppressed, thereby improving reliability.

The display panel 300 may include a lower panel 100 and an upper panel 200 facing the lower panel 100 as shown in FIG. 4. The upper panel 200 may be positioned on an opposite surface to the contact surface of the lower panel 100 and may expose a part of an edge region of the lower panel 100. The printed circuit film 580 may attach on the exposed region of the lower panel 100.

Hereinafter, a display device including a touch sensor according to an exemplary embodiment of the present invention will be described with reference to FIGS. 6 and 7. Like reference numerals designate like elements in the exemplary embodiment described above and the same description is omitted, which are applied to all subsequent exemplary embodiments.

Figure 6:
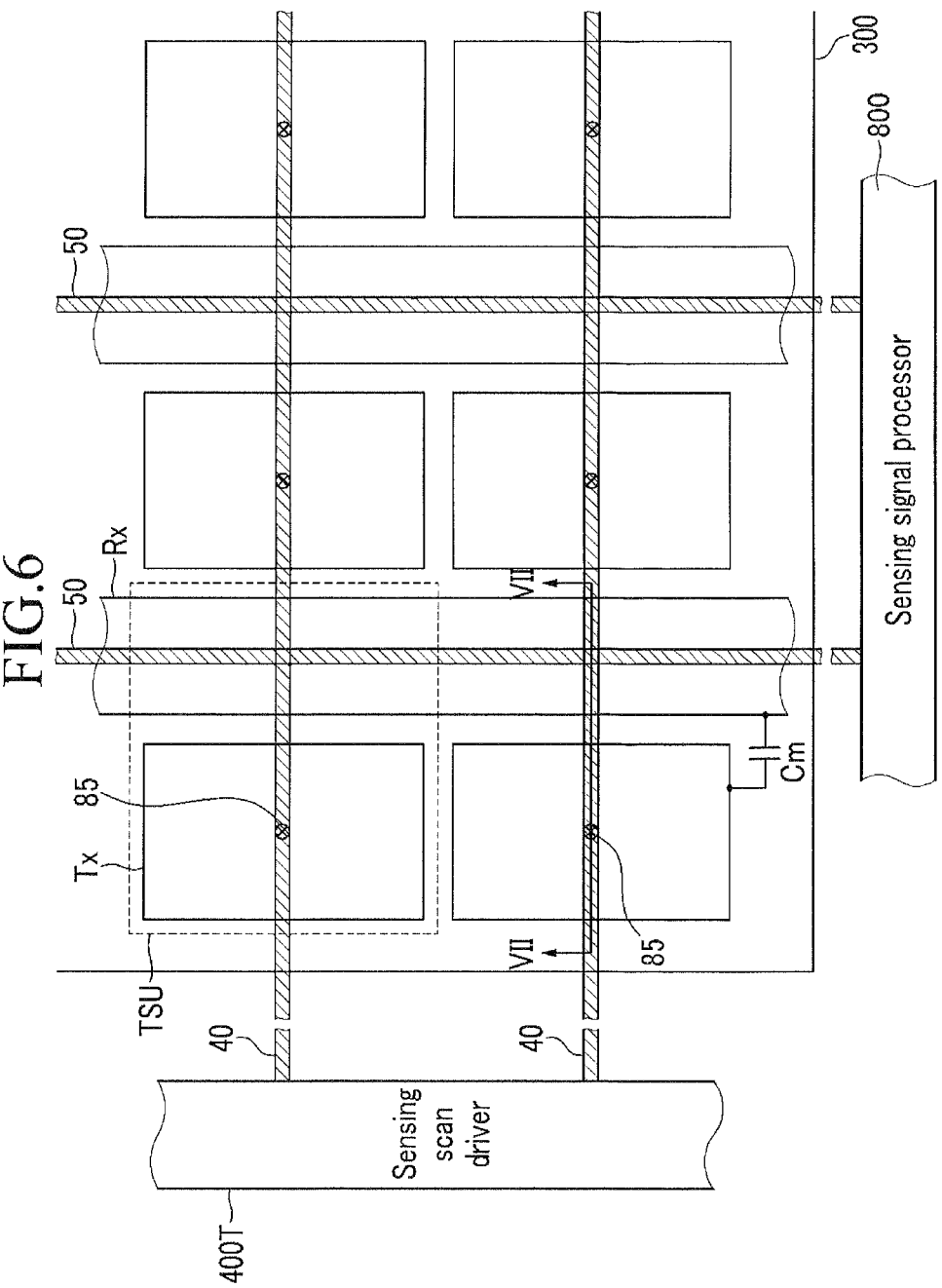
FIG. 6 is a plan view for illustrating a display device including a touch sensor according to an exemplary embodiment of the present invention.
Figure 7:
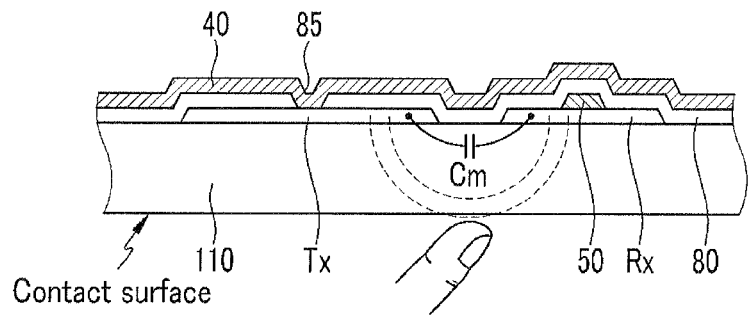
FIG. 7 is a cross-sectional view for illustrating the display device of FIG. 6 taken along line VII-VII.

FIG. 6 is a plan view of a display device including a touch sensor according to an exemplary embodiment of the present invention, and FIG. 7 is a cross-sectional view of the display device of FIG. 6 taken along line VII-VII.

Referring to FIGS. 6 and 7, a display panel 300 of a display device including a touch sensor according to an exemplary embodiment of the present invention includes an insulation substrate 110 including a contact surface. For convenience of showing and description, the contact surface of the insulation substrate 110 is defined as a lower side and the opposite side is defined as an upper side.

A plurality of sensing input electrodes Tx and a plurality of sensing output electrodes Rx are positioned on the insulation substrate 110.

The sensing input electrodes Tx may be arranged in a matrix form. The plurality of sensing input electrodes Tx arranged in a column direction forms one sensing input electrode column, and the plurality of sensing input electrodes Tx arranged in a row direction forms one sensing input electrode row. The plurality of sensing input electrodes Tx positioned in one sensing input electrode column may be connected to each other. A shape of each sensing input electrode Tx may be a quadrangle as shown in FIG. 6, but is not limited thereto and may be various. A length of one side of each sensing input electrode Tx may be substantially several mm, but the size thereof may vary according to a contact object and a contacting method.

The sensing output electrodes Rx may extend in a column direction, and the plurality of sensing output electrodes Rx arranged in the row direction may be disposed with predetermined intervals. Each sensing output electrode Rx is disposed between two adjacent sensing input electrode columns, and the sensing output electrodes Rx and the sensing input electrodes Tx may be alternately arranged in a row direction.

A touch sensor TSU may include a part of sensing output electrodes Rx, a sensing input electrodes Tx and a sensing capacitor Cm formed between the electrodes Rx and Tx. When a contact is made on a display panel 300, a charge amount of the sensing capacitor Cm changes and a sensing output signal based on the changed charge amount may be outputted. In one embodiment, the sensing output electrode Rx and the sensing input electrode Tx may be positioned on the same plane on the insulation substrate 110 in a cross-sectional structure. Alternatively, the electrodes Rx and Tx may be positioned in different layers, respectively. When the sensing output electrode Rx and the sensing input electrode Tx are positioned in the different layers, at least a part thereof may be overlapped with each other.

The sensing output electrode Rx and the sensing input electrode Tx may be made of a transparent conductive material such as indium tin oxide (ITO) or indium zinc oxide (IZO).

Referring to FIG. 6, the sensing input electrodes Tx positioned in one row are electrically connected to a sensing input signal line 40 which is connected with the sensing scan driver 400T, and each sensing output electrode Rx is electrically connected with a sensing output signal line 50 which is connected with the sensing signal processor 800.

The sensing input signal line 40 and the sensing output signal line 50 may include a conductive material having lower resistance than the sensing input electrode Tx and the sensing output electrode Rx, for example, metal such as copper (Cu). In more detail, the sensing input signal line 40 and the sensing output signal line 50 may be made of aluminum-based metals such as aluminum (Al) or an aluminum alloy, silver-based metals such as silver (Ag) or a silver alloy, copper-based metals such as copper (Cu) or a copper alloy, molybdenum-based metals such as molybdenum (Mo) or a molybdenum alloy, chromium (Cr), tantalum (Ta) and titanium (Ti). However, the sensing input signal line 40 and the sensing output signal line 50 may have a multi-layered structure including two or more different conductive materials.

Accordingly, lower resistance of a sensing input signal line 40 and a sensing output signal line 50 may reduce signal delay and as a result, a touch sensor TSU may have lower resistance. Such lower resistance may render the display panel to have accurate contact information when the display panel 300 becomes larger.

Referring to FIG. 7, the sensing input signal line 40 and the sensing output signal line 50 may be positioned in different layers. For example, as shown in FIG. 7, the sensing input signal line 40 may be positioned above the sensing output signal line 50, or vice verse. Here, as shown in FIG. 7, one exemplary embodiment where the sensing input signal line 40 is positioned above the sensing output signal line 50 based on the insulation substrate 110 will be described.

The sensing output signal line 50 may be positioned on the sensing output electrode Rx. The sensing output signal line 50 may be elongated in a column direction, and each sensing output signal line 50 may be connected by directly contacting one sensing output electrode Rx. The sensing output signal line 50 may transmit a sensing output signal to the sensing signal processor 800.

An insulating layer 80 is positioned on the sensing output signal line 50. The insulating layer 80 may include an organic insulating material or an inorganic insulating material. The insulating layer 80 may include a contact hole 85 which exposes the sensing input electrode Tx.

A plurality of sensing input signal lines 40 may be positioned on the insulating layer 80. The sensing input signal line 40 may be elongated in a row direction, and may be electrically connected with a plurality of sensing input electrodes Tx which are arranged in a row direction through the contact hole 85. Accordingly, the plurality of sensing input electrodes Tx which are arrange in one row direction are electrically connected to each other through one sensing input signal line 40. One sensing input electrode Tx and a part of the sensing output electrode Rx which is adjacent thereto may form one touch sensor TSU together, and the same sensing input signal which is inputted from the sensing scan driver 400T through each sensing input signal line 40 may be transmitted to a plurality of touch sensors TSU which are arranged in a row direction.

In one embodiment where the sensing input signal line 40 and the sensing output signal line 50 are opaque, the sensing input signal line 40 and the sensing output signal line 50 may be covered by a light blocking member (not shown).

Next, a display device including a touch sensor according to an exemplary embodiment of the present invention will be described with reference to FIGS. 8 and 9.

Figure 8:
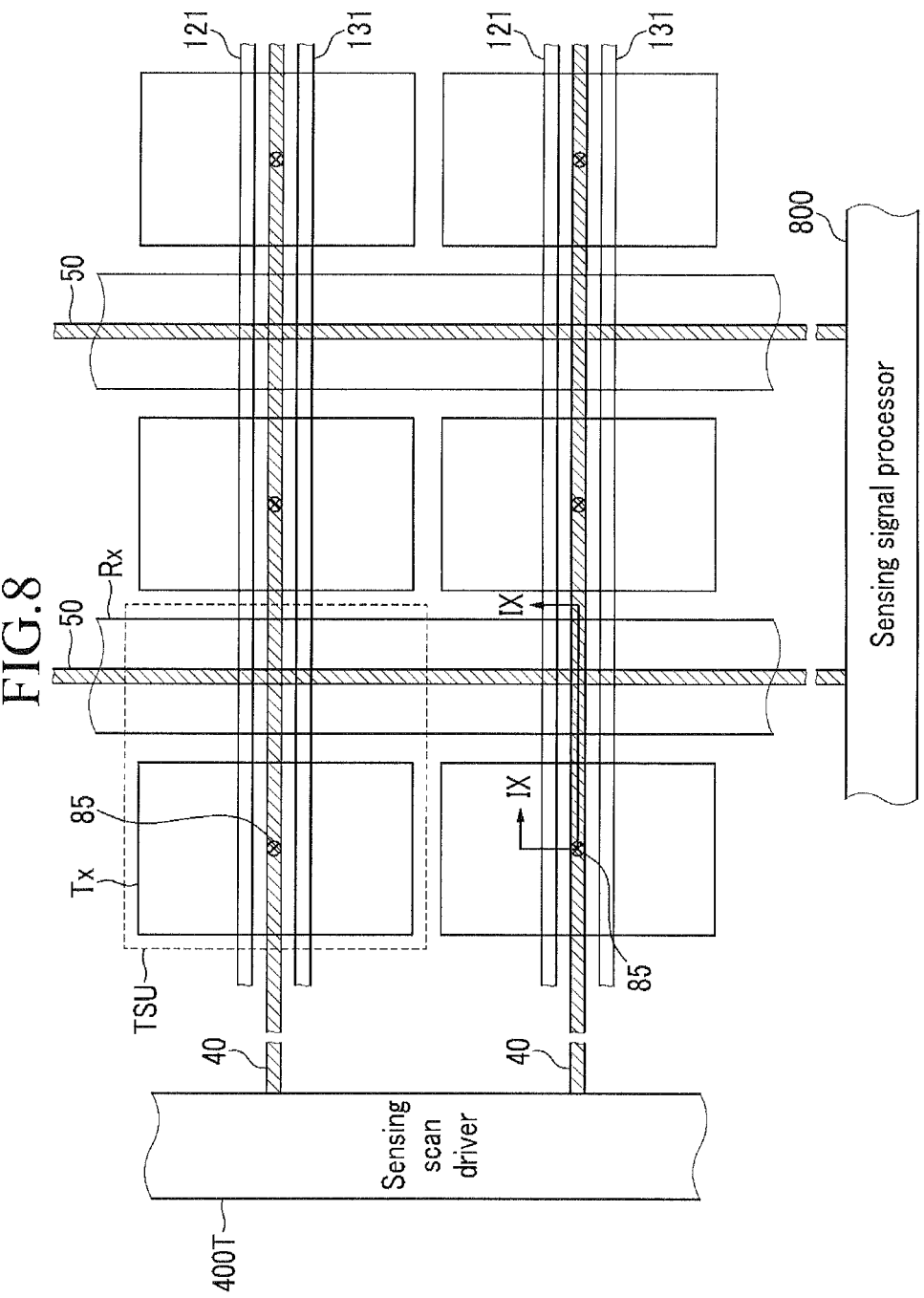
FIG. 8 is a plan view for illustrating a display device including a touch sensor according to an exemplary embodiment of the present invention.
Figure 9:
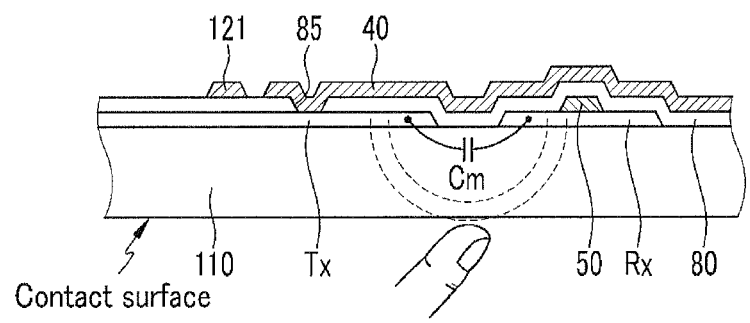
FIG. 9 is a cross-sectional view for illustrating the display device of FIG. 8 taken along line IX-IX.

FIG. 8 is a plan view of a display device including a touch sensor according to an exemplary embodiment of the present invention, and FIG. 9 is a cross-sectional view of the display device of FIG. 8 taken along line IX-IX. The exemplary embodiment is almost the same as the exemplary embodiment shown in FIGS. 6 and 7 described above, but at least one of a plurality of gate lines 121 which transmit gate signals and a plurality of common voltage lines 131 which transmit common voltage Vcom may be further positioned on the insulation substrate 110.

Referring to FIG. 8, the gate lines 121 and the common voltage lines 131 may be positioned on the same layer and may be made of the same material on the same layer as the sensing input signal line 40. The gate lines 121 and the common voltage lines 131 may extend in a column direction in substantially parallel to the sensing input signal lines 40. The signal lines 40, 121, and 131 may be disposed to be adjacent to each other on a plane. One of the sensing input signal lines 40 may be positioned between a pair of one of the gate lines 121 and one of the common voltage lines 131.

Although not shown in FIG. 8, a plurality of gate lines 121 and common voltage lines 131 may be further positioned between the adjacent sensing input signal lines 40, and the number thereof may vary according to resolution of the display panel 300.

Referring to FIG. 9, the insulating layer 80 may have low capacitance so that signal delay by its parasitic capacitance does not occur. For low capacitance, the insulating layer 80 may be formed of insulating material having a low dielectric constant. In another embodiment, the insulating layer 80 may have sufficient thickness that signal delay does not occur by a parasitic capacitor that the insulation layer 80 is formed between the gate line 121 and the sensing input electrode Tx. The parasitic capacitance may also be formed between the gate line 121 and the sensing output electrode Rx, or between the gate line 121 and the sensing output signal line 50. Similarly, a delay of the data signal may be reduced by decreasing parasitic capacitance generated between the data line and the sensing input electrode Tx, the sensing output electrode Rx, or the sensing output signal line 50. According to various structure and size of the display device, the dielectric constant and the thickness of the insulating layer 80 may be optimized, reducing signal delay of the gate signal and the data signal.

Next, a display device including a touch sensor according to an exemplary embodiment of the present invention will be described with reference to FIGS. 10 and 11.

Figure 10:
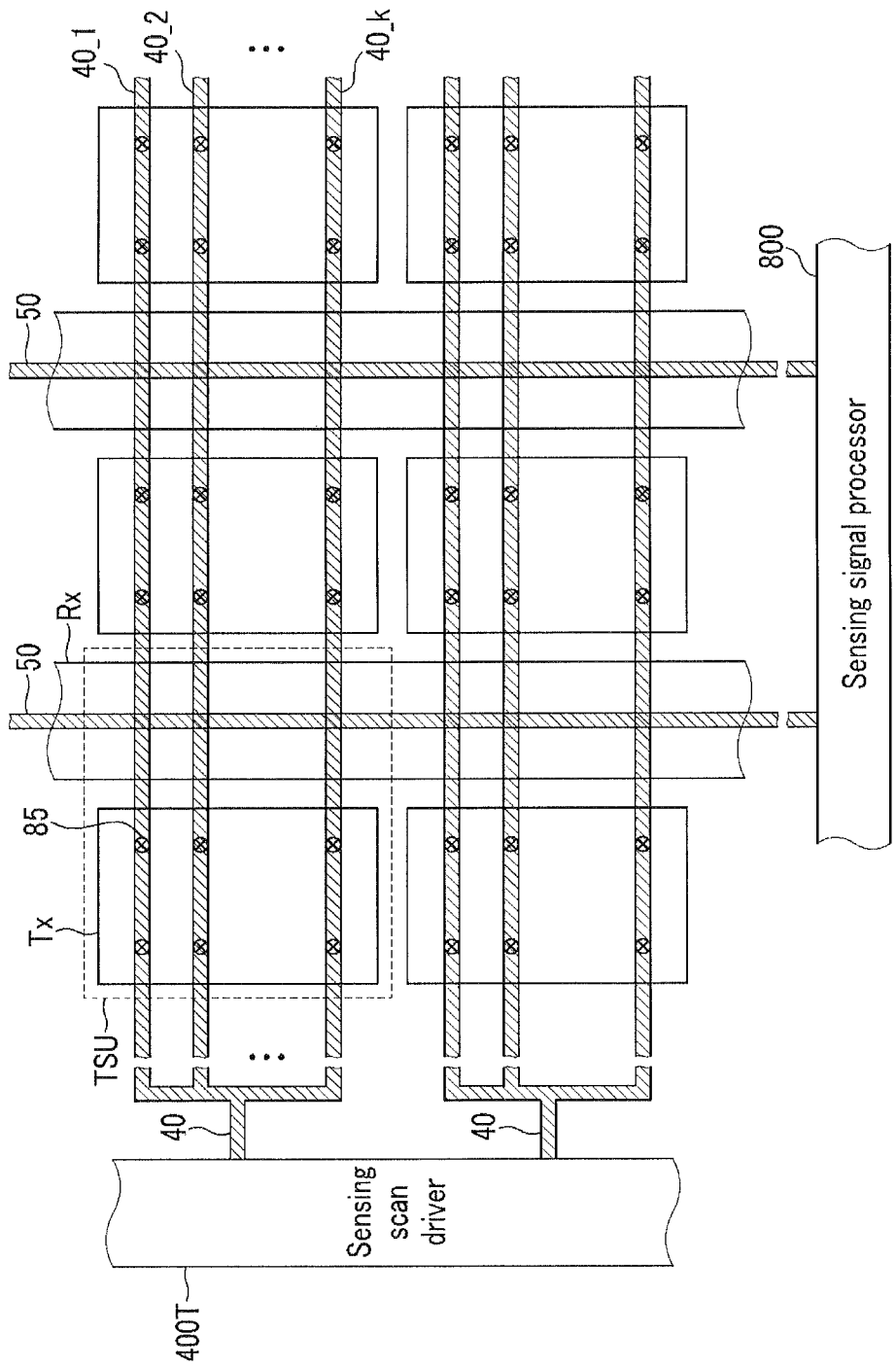
FIGS. 10 and 11 are plan views for illustrating a display device including a touch sensor according to an exemplary embodiment of the present invention, respectively.
Figure 11:
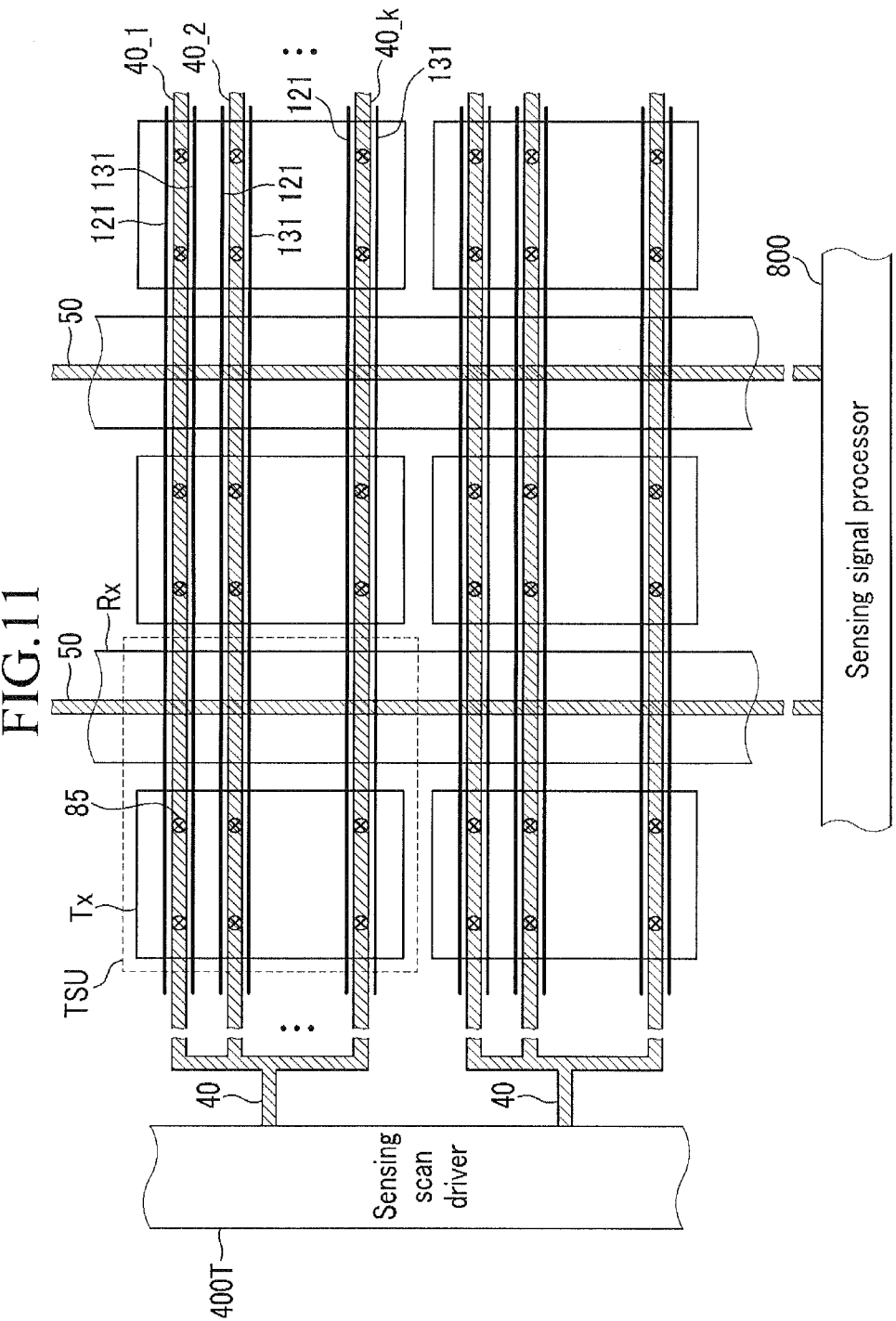

FIGS. 10 and 11 are plan views of a display device including a touch sensor according to an exemplary embodiment of the present invention, respectively.

Referring to FIG. 10, a display device may include the same touch sensor of FIGS. 6 and 7 except that each of sensing input signal lines 40 may include a plurality of sub input signal lines 40_1, 40_2, . . . , 40_k (k is a natural number of 2 or more). The plurality of sub input signal lines 40_1, 40_2, . . . , 40_k may be arranged in a row direction in substantially parallel to each other. The plurality of sub input signal lines 40_1, 40_2, . . . , 40_k positioned in each sensing input electrode row may be electrically connected with the plurality of sensing input electrodes Tx positioned in the corresponding sensing input electrode row through the contact hole 85.

Referring to FIG. 11, the display device may include the same touch sensor of FIG. 10 except that each of the sub input signal lines 40_1, 40_2, . . . , 40_k may be positioned between a pair of one of gate lines 121 and one of common voltage lines 131. As described above, a plurality of gate lines 121 and common voltage lines 131 may be further positioned between the adjacent sub input signal lines 40_1, 40_2, . . . , 40_k.

Then, a structure of the display device including a touch sensor according to the exemplary embodiment of the present invention will be described with reference to FIG. 12.

Figure 12:
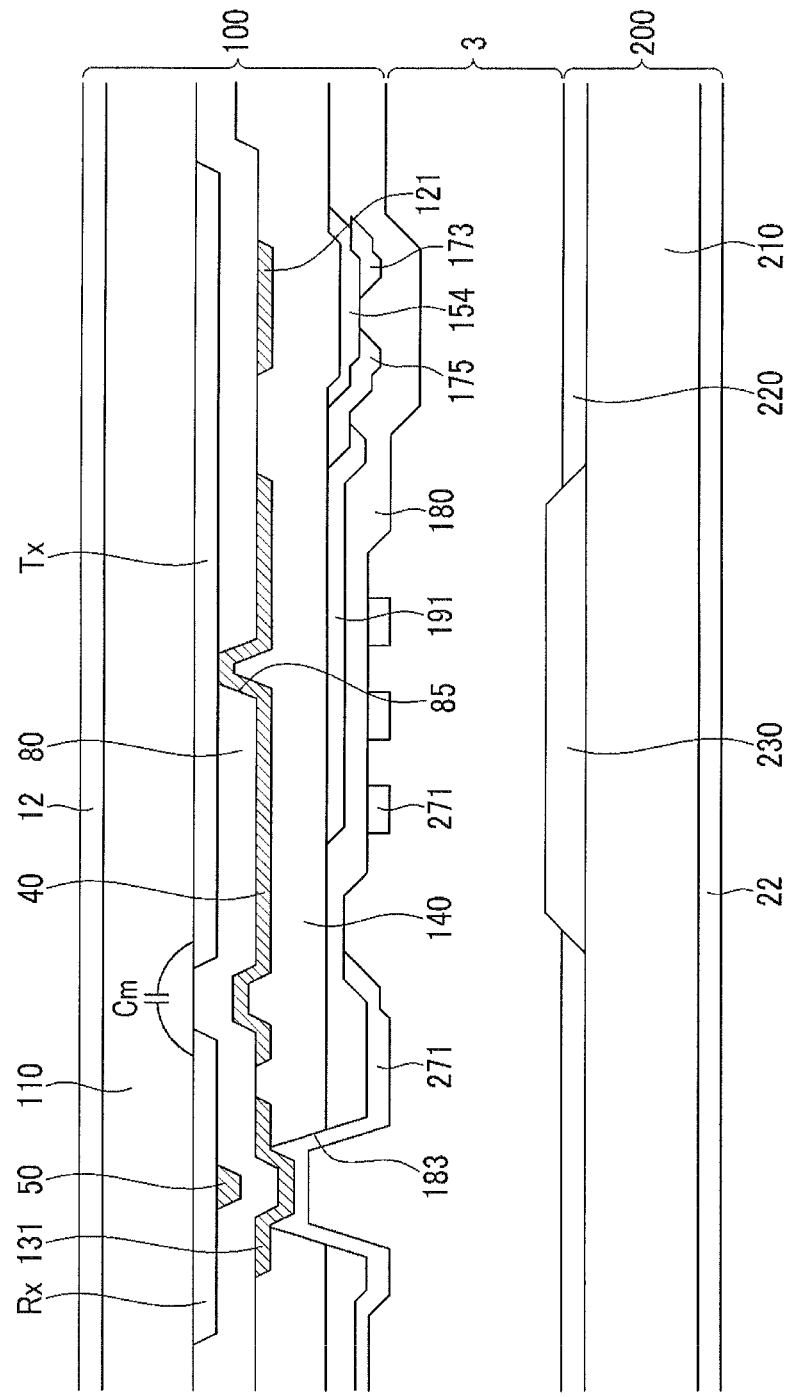
FIG. 12 is a cross-sectional view for illustrating a display device including a touch sensor according to an exemplary embodiment of the present invention.

FIG. 12 is a cross-sectional view of the display device including a touch sensor according to the exemplary embodiment of the present invention. The display device including a touch sensor according to the exemplary embodiment of the present invention includes a lower panel 100. For a liquid crystal display, the display may further include an upper panel 200 and a liquid crystal layer 3. The liquid crystal layer 3 may be positioned between the two panels 100 and 200.

The lower panel 100 may have a contact surface and the other surface facing the liquid crystal layer 3. The lower panel may include a plurality of sensing input electrodes Tx and a plurality of sensing output electrodes Rx positioned on the insulation substrate 110. The lower panel may further include a sensing output signal line 50 positioned on the sensing output electrode Rx. Since the description for the sensing input electrode Tx, the sensing output electrode Rx and the sensing output signal line 50 is the same as the exemplary embodiment described above, the detailed description is omitted.

An insulating layer 80 having a contact hole 85 which exposes the sensing input electrodes Tx is disposed on the sensing output signal line 50.

A gate conductor including a plurality of sensing input signal lines 40, a plurality of gate lines 121 and a plurality of common voltage lines 131 may be positioned on the insulating layer 80.

The gate conductor may be made of aluminum-based metals such as aluminum (Al) or an aluminum alloy, silver-based metals such as silver (Ag) or a silver alloy, copper-based metals such as copper (Cu) or a copper alloy, molybdenum-based metals such as molybdenum (Mo) or a molybdenum alloy, chromium (Cr), tantalum (Ta) and titanium (Ti). However, the gate conductor may have a multi-layered structure including at least two conductive layers having different physical properties.

A gate insulating layer 140 is positioned on the gate conductor. The gate insulating layer 140 may have a multilayered structure including at least two insulating layers having different physical properties.

A semiconductor 154 made of amorphous silicon, polysilicon or the like is disposed on the gate insulating layer 140. The semiconductor 154 may be overlapped with the gate line 121.

A source electrode 173 and a drain electrode 175 which face each other are positioned on the semiconductor 154. Data voltage may be transmitted to the source electrode 173.

The gate line 121 overlapped with the semiconductor 154, the source electrode 173 and the drain electrode 175 forms a thin film transistor together with the semiconductor 154.

Ohmic contacts (not shown) may be formed between the semiconductor 154 and the source electrode 173, and between the semiconductor 154 and the drain electrode 175. The ohmic contact may be made of a material such as n+ hydrogenated amorphous silicon in which an n-type impurity such as phosphorus is doped at high concentration or may be made of silicide.

A pixel electrode 191 is positioned on the drain electrode 175 and the gate insulating layer 140. The pixel electrode 191 may directly contact a part of the drain electrode 175 and may receive data voltage from the drain electrode 175. The pixel electrode 191 may be made of a transparent conductive material such as indium tin oxide (ITO), indium zinc oxide (IZO) or the like.

A passivation layer 180 is disposed on the thin film transistor and the pixel electrode 191. The passivation layer 180 may be made of an inorganic insulator such as silicon nitride and silicon oxide or an organic insulator. A contact hole 183 which exposes the common voltage line 131 may be formed in the passivation layer 180 and the gate insulating layer 140.

A common electrode 271 may be formed on the passivation layer 180. The common electrode 271 may include a plurality of branch electrodes which is overlapped with the pixel electrode 191. The common electrode 271 may receive common voltage Vcom from the common voltage line 131 through the contact hole 183. However, the display device according to the exemplary embodiment of the present invention is not limited to the structure including the common electrode 271.

A polarizer 12 may be positioned on the contact surface of the insulation substrate 110.

Next, the upper panel 200 may include a light blocking member 220, color filters 230 and an insulation substrate 210. The light blocking member 220 and color filters 230 may be positioned on the insulation substrate. The insulation substrate may be made of transparent glass, plastic or the like. The light blocking member 220 is called a black matrix and blocks light leakage. The color filters 230 almost exist in a region surrounded by the light blocking member 220. The region surrounded by the light blocking member 220 may be defined as a pixel area where light is transmitted. At least one of the color filter 230 and the light blocking member 220 may be positioned on the upper panel 200.

A polarizer 22 may be positioned on the opposite surface to the surface of the insulation substrate 210 with the light blocking member 220.

The liquid crystal layer 3 may be positioned between the lower panel 100 and the upper panel 200. The pixel electrode 191 receiving the data voltage may generate an electric field in the liquid crystal layer 3 together with the common electrode 271 receiving the common voltage Vcom. The liquid crystal layer 3 of the display device according to the exemplary embodiment of the present invention includes liquid crystal molecules (not shown), and the liquid crystal molecules may be arranged so that a long axis thereof is horizontal to the surfaces of the two panels 100 and 200 in a state where the electric field is not applied.

Figure 13:
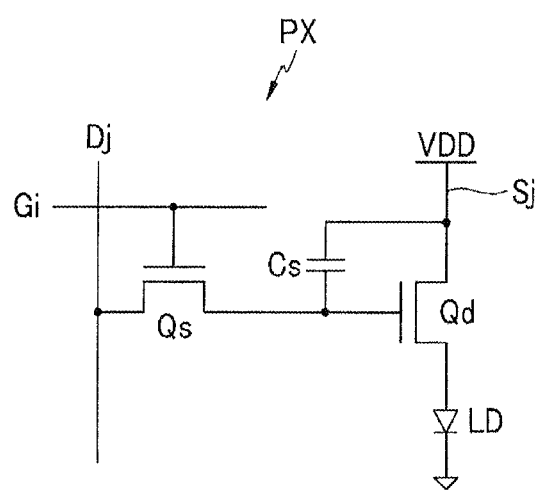
FIG. 13 is a schematic circuit diagram for illustrating a structure of one pixel of a display device including a touch sensor according to an exemplary embodiment of the present invention.
Figure 14:
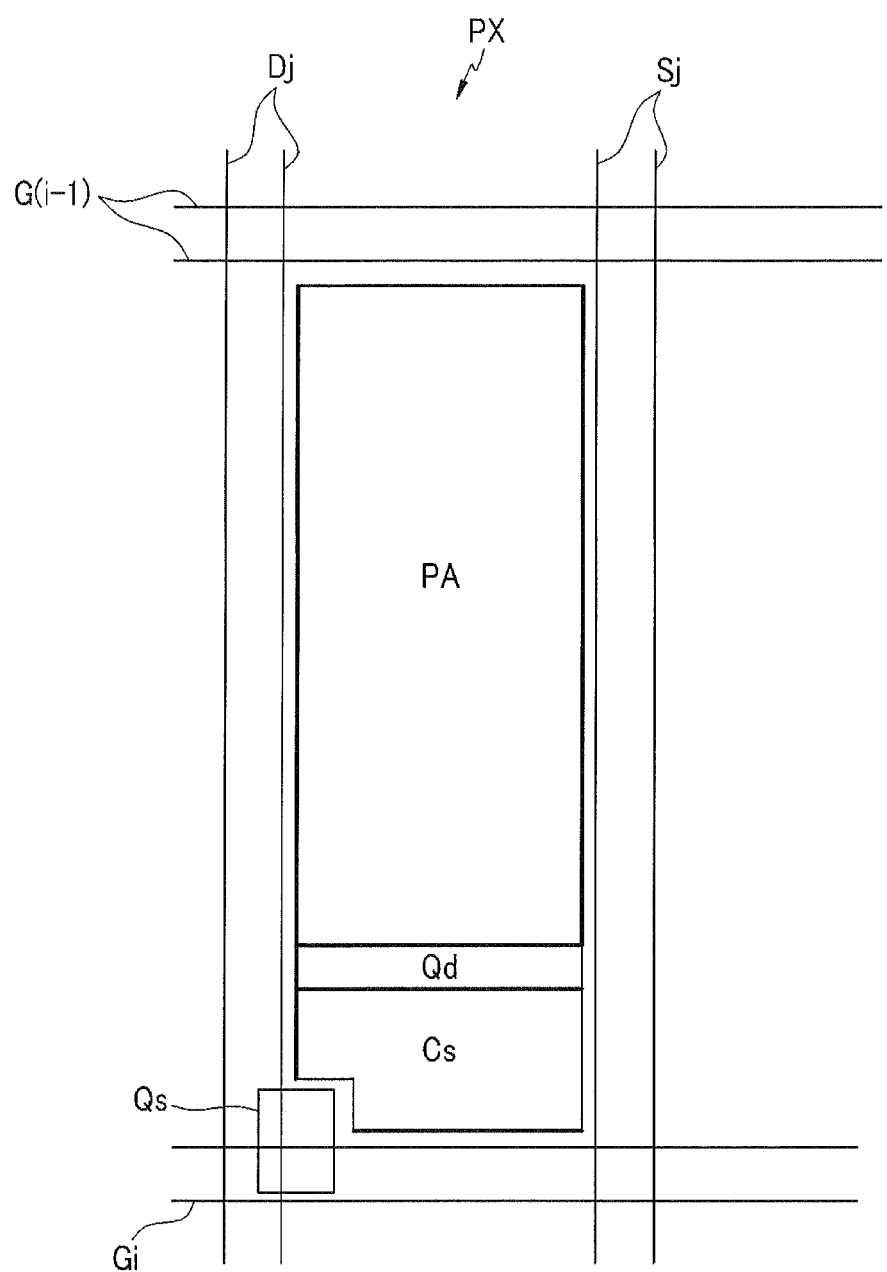
FIG. 14 is a layout view for illustrating the display device including a touch sensor according to the exemplary embodiment of the present invention shown in FIG. 13.
Figure 15:
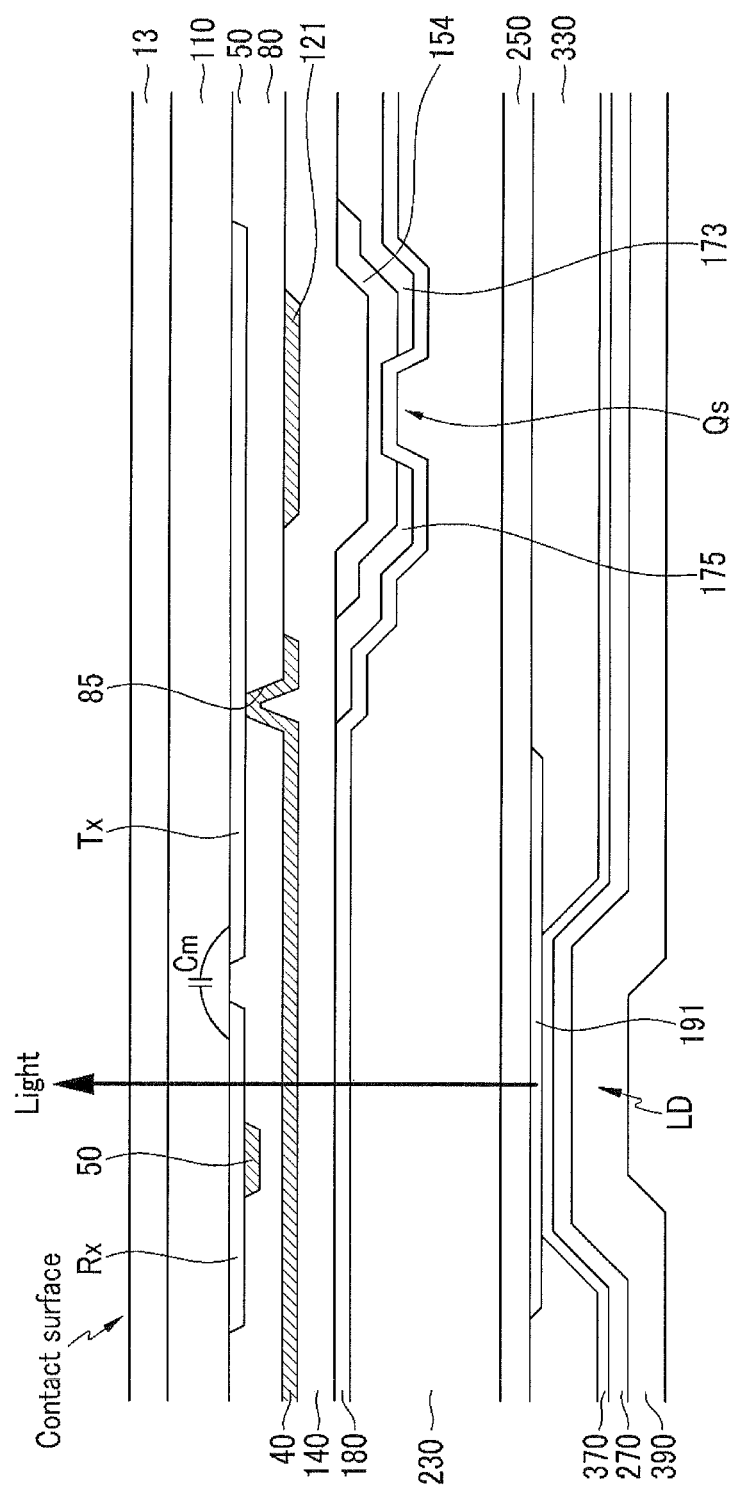
FIG. 15 is a cross-sectional view for illustrating the display device including a touch sensor according to the exemplary embodiment of the present invention.

Next, a display device including a touch sensor according to an exemplary embodiment of the present invention will be described with reference to FIGS. 13, 14 and 15. FIG. 13 is a schematic circuit diagram for illustrating one pixel of a display device including a touch sensor according to an exemplary embodiment of the present invention. FIG. 14 is a layout view for illustrating structure of the display device including a touch sensor of FIG. 13. FIG. 15 is a cross-sectional view for illustrating structure of the display device including a touch sensor of FIG. 13.

The display device according to the exemplary embodiment of the present invention may be an organic light emitting display device (OLED), and like those described above, the display panel 300 includes a plurality of pixels PX arranged in a matrix form and various signal lines.

Referring to FIGS. 13 and 14, the signal lines may include a plurality of scanning signal lines Gi transmitting gate signals, a plurality of data lines Dj transmitting data voltage, a plurality of driving voltage lines Sj transmitting driving voltage VDD, and the like.

Each pixel PX includes a switching element Qs, a driving switching element Qd, a storage capacitor Cs and an organic light emitting element LD.

The switching element Qs may include a control terminal connected to the scanning signal line Gi, an input terminal connected to the data line Dj, and an output terminal connected to the driving switching element Qd. The switching element Qs transmits data voltage received from the data line Dj to the driving switching element Qd in response to the gate signal received from the scanning signal line Gi.

The switching element Qd may include a control terminal connected to the switching element Qs, an input terminal connected to the driving voltage line Sj, and an output terminal connected to the organic light emitting element LD. The driving switching element Qd may drive an output current of which the magnitude varies according to voltage between the control terminal and the output terminal.

The capacitor Cs is connected between the control terminal and the input terminal of the driving switching element Qd, and may charge data voltage applied to the control terminal of the driving switching element Qd and maintain the data voltage even after the switching element Qs is turned off.

The organic light emitting element LD may be an organic light emitting diode (OLED) that has an anode connected to the output terminal of the driving switching element Qd and a cathode connected to ground voltage or common voltage. The organic light emitting element LD emits light in different intensities according to an output current of the driving switching element Qd, thereby displaying an image.

Referring to FIG. 14, the data line Dj and the driving voltage line Sj cross the scanning signal line Gi to be substantially parallel to each other. As described above, the region surrounded by the light blocking member may be defined as a pixel area PA which displays an image.

Referring to FIG. 15, the display device including a touch sensor according to the exemplary embodiment of the present invention is identical to that of FIG. 12 except that the display device has a switching element Qs having a recessed gate structure. The gate line 121 is recessed into a semiconductor 154. The switching element Qs may include the recessed gate line 121, a source electrode 173 and a drain electrode 175 formed on the semiconductor 154.

The passivation layer 180 is positioned on the source electrode 173, the drain electrode 175 and the gate insulating layer 140. A contact hole (not shown) may be formed in the passivation layer 180, exposing the drain electrode 175. Further, a control terminal of the driving switching element Qd (not shown) may be electrically connected with the drain electrode 175 through a contact assistant (not shown) and the like.

A color filter 230 may be positioned on the switching element Qs and the driving switching element Qd (not shown). In one embodiment, the color filter 230 may be omitted.

An overcoat layer 250 may be positioned on the color filter 230. The overcoat layer 250 may be insulating layer having a planarization function.

A pixel electrode 191 may be positioned on the overcoat layer 250, electrically being connected to the output terminal of a driving switching element Qd (not shown). The pixel electrode 191 may be made of a transparent conductive material such as ITO or IZO.

An organic light emitting member 370 is formed on the pixel electrode 191. The organic light emitting member 370 may emit white light through the color filter 230. In another embodiment, when the color filter 230 is omitted, the organic light emitting member 370 positioned at each pixel PX may emit light having one color of primary colors.

A partition 330 may be further formed between the pixel electrode 191 and the organic light emitting member 370, forming an opening like a bank that locates on the pixel electrode 191. The partition 330 includes a black pigment to serve as a light blocking member.

An opposed electrode 270 transmitting the common voltage Vcom is formed on the organic light emitting member 370. The opposed electrode 270 may be made of reflective metals including calcium (Ca), barium (Ba), magnesium (Mg), aluminum (Al), silver (Ag) and the like.

An encapsulation layer 390 may be positioned on the opposed electrode 270. The encapsulation layer 390 encapsulates the organic light emitting member 370 and the opposed electrode 270 to prevent moisture and/or oxygen from penetrated from the outside.

The organic light emitting element LD may include the pixel electrode 191, the organic light emitting member 370 and the opposed electrode 270. The organic light emitting element LD emits light to an upper side of the contact surface of the insulation substrate 110 to display an image.

Tempered glass 13 may be further attached on the contact surface of the insulation substrate 110.

Hereinafter, a touch sensor included in a display device according to an exemplary embodiment of the present invention will be described with reference to FIGS. 16 to 22.

Figure 16:
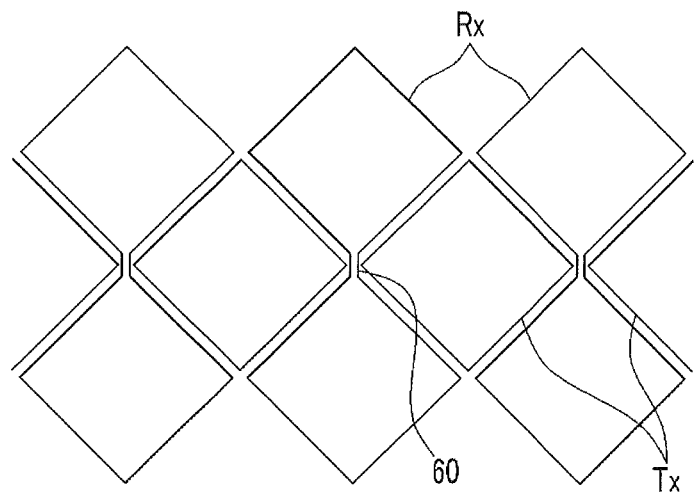
FIGS. 16, 17 and 18 are plan views for illustrating a sensing input electrode and a sensing output electrode according to an exemplary embodiment of the present invention, respectively.
Figure 17:
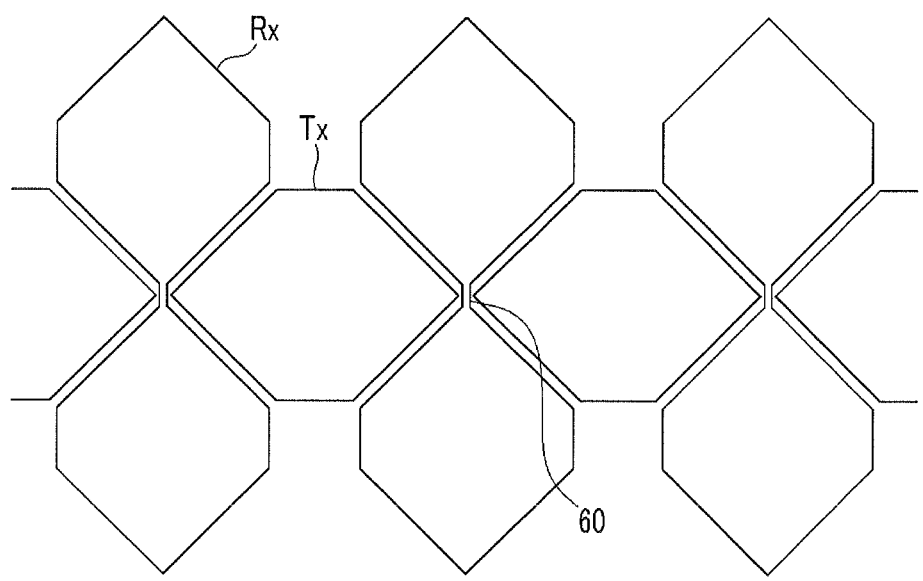
Figure 18:
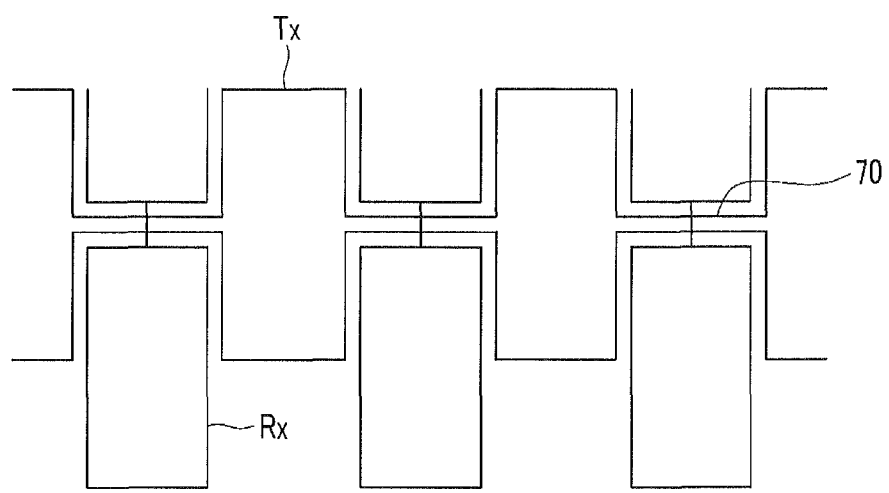
Figure 19:
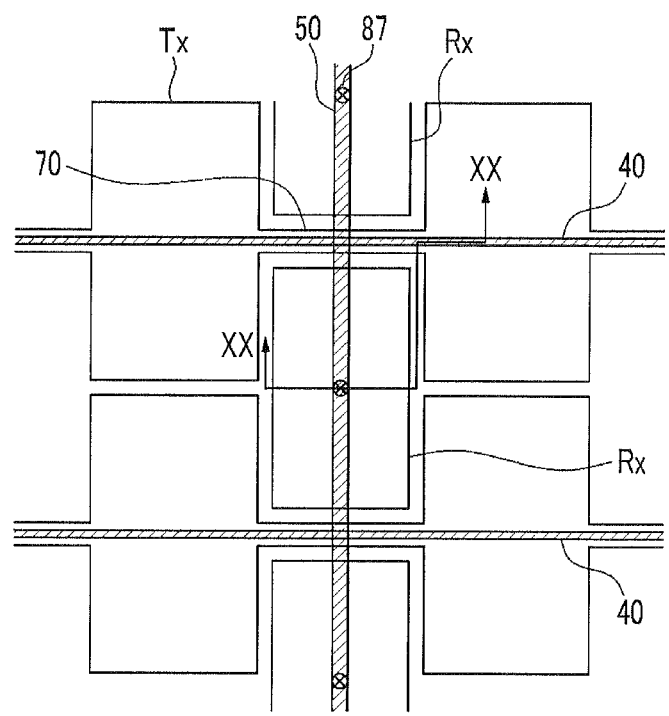
FIG. 19 is a plan view for illustrating a display device including a touch sensor according to an exemplary embodiment of the present invention.
Figure 20:
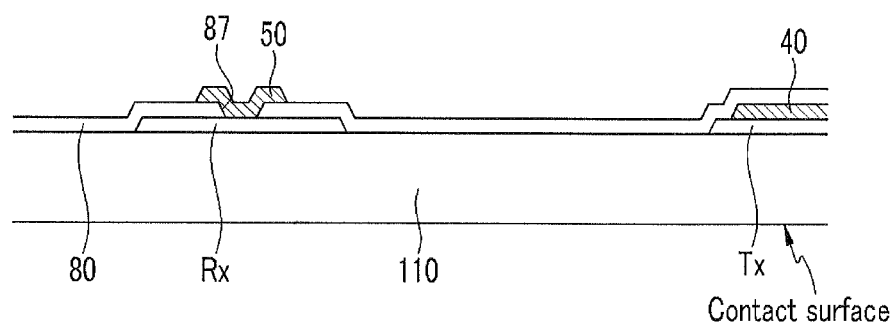
FIG. 20 is a cross-sectional view for illustrating the display device of FIG. 19 taken along line XX-XX.
Figure 21:
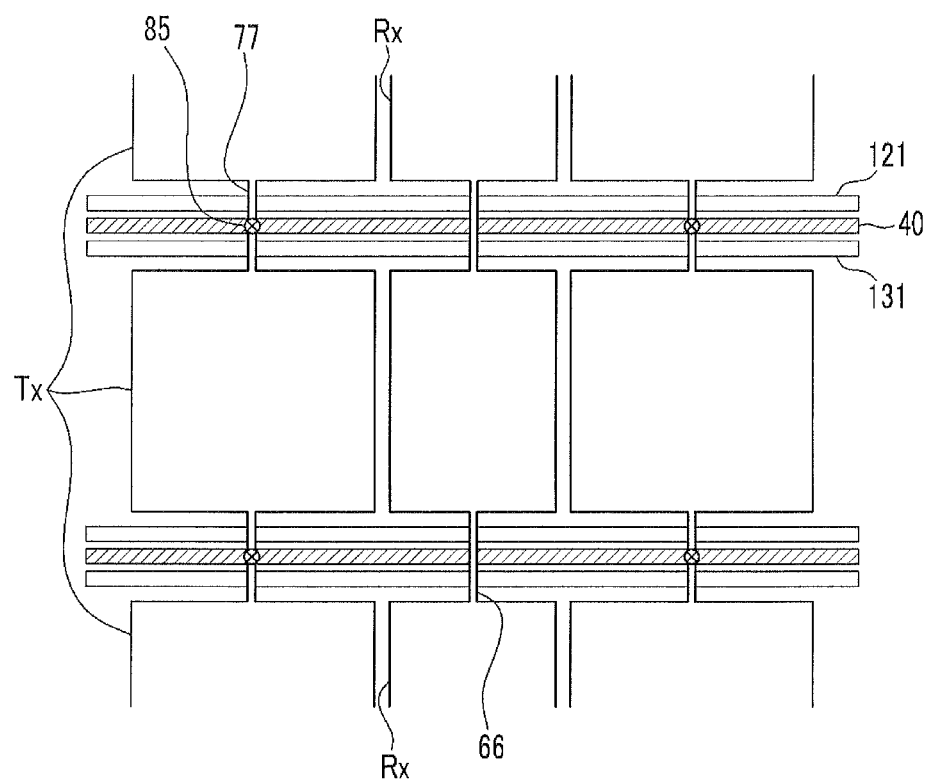
FIGS. 21 and 22 are plan views for illustrating the display device including a touch sensor according to the exemplary embodiment of the present invention, respectively.
Figure 22:
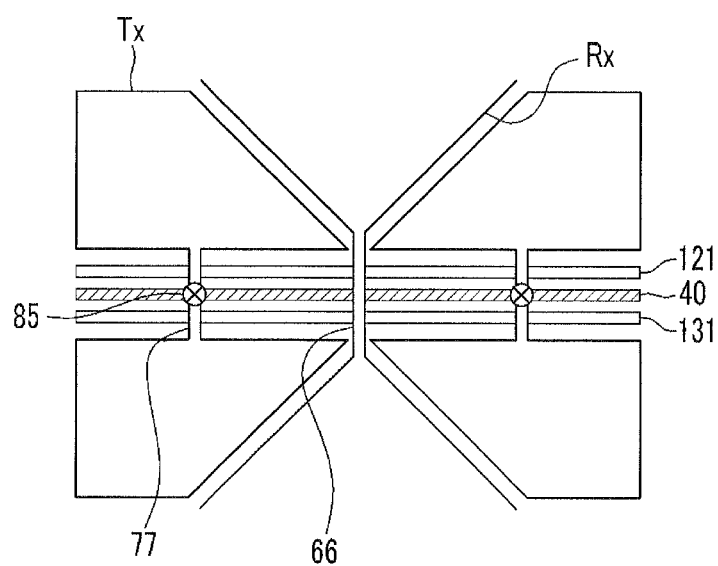

FIGS. 16, 17 and 18 are plan views for illustrating a sensing input electrode and a sensing output electrode according to an exemplary embodiment of the present invention, respectively. FIG. 19 is a plan view for illustrating a display device including a touch sensor according to an exemplary embodiment of the present invention. FIG. 20 is a cross-sectional view for illustrating the display device of FIG. 19 taken along line XX-XX. FIGS. 21 and 22 are plan views of the display device including a touch sensor according to the exemplary embodiment of the present invention, respectively.

Referring to FIG. 16, a plurality of sensing input electrodes Tx may have a diamond shape, each being isolated from each other. Further, a plurality of sensing output electrodes Rx may have a pair of diamond-shape electrodes connected to each other via a connection part 60. The pair of diamond-shape electrodes may be arranged in a column direction and connected by the connection part 60 running between adjacent sensing input electrodes Tx.

Referring to FIG. 17, in another embodiment, the sensing input electrode Tx may have a hexagonal shape. Similarly, the sensing output electrode Rx may have a hexagonal shape. The hexagonal shape may not be limited to FIG. 17 and it may different shape according to configuration of the electrodes Rx and Tx. In addition, the sensing input electrode Tx and the sensing output electrode Rx may include various polygonal or circular sensing electrodes.

Referring to FIG. 18, sensing electrodes Tx and Rx may have another structure according to the exemplary embodiment of the present invention. A plurality of sensing input electrodes Tx positioned in one sensing input electrode row may be physically and electrically connected to each other through a connection part 70 unlike the exemplary embodiment of FIG. 16. Each of sensing output electrodes Rx may include a plurality of sensing electrodes arranged in a column direction, and the connection part 70 may run between adjacent sensing electrodes of the sensing output electrodes Rx. The plurality of sensing electrodes included in one sensing output electrode Rx are separated from each other, but may be electrically connected to each other by various methods. In one embodiment, the sensing electrodes which are adjacent to each other in a column direction may be connected to each other through a connection bridge. Another embodiment will be described with reference to FIGS. 19 and 20. FIG. 19 is a plan view for illustrating a touch sensor of the display device according to the inventive concept. FIG. 20 is a cross sectional view taken along XX-XX of FIG. 19.

Referring to FIG. 19, a touch sensor of the display device may include a sensing input signal line 40 connected with the sensing input electrodes Tx arranged in a row direction and a sensing output signal line 50 connected with a plurality of sensing electrodes of the sensing output electrode Rx arranged in a column direction.

Referring to FIG. 19, the sensing input electrode Tx and the sensing output electrode Rx are positioned on the insulation substrate 110, and the sensing input signal line 40 may be positioned on the sensing input electrode Tx. The sensing input signal line 40 may directly be formed on the sensing input electrode Tx, being connected with the sensing input electrode Tx.

An insulating layer 80 is positioned on the sensing output electrode Rx and the sensing input signal line 40. The insulating layer 80 may include a contact hole 87 that exposes a portion of the sensing output electrode Rx.

The sensing output signal line 50 may be positioned on the insulating layer 80. The sensing output signal line 50 is connected with the sensing output electrode Rx via the contact hole 87. The sensing output signal line 50 may run in parallel to a column direction, and a plurality of sensing electrodes arranged in a column direction may form one sensing output electrode Rx by being electrically connected to each other via the contact hole 87.

Referring to FIG. 21, a plurality of sensing input electrodes Tx may include thinner portions 77 between the sensing input electrodes Tx to minimize a parasitic capacitance between the sensing input electrodes Tx and a plurality of gate lines 121 and a plurality of common voltage lines 131, respectively. When a plurality of gate lines 121 or common voltage lines 131 run over the electrodes Tx and Rx, the overlapped structure between the electrodes Tx and Rx and the gate lines 121 or the common voltage lines 131 may have an increased parasitic capacitance, resulting in a signal delay to the gate lines or the common voltage line 131. Instead, when a plurality of gate lines 121 or common voltage lines 131 run under the thinner portion 77 having a relatively thin width, overlapped area may be minimized, resulting in a decreased parasitic capacitance.

Further, the sensing input signal lines 40 may run between the gate lines 121 and the common voltage lines 131, respectively. The sensing input signal lines 40 may also run under the thinner portion 77 of the sensing input electrode Tx. The thinner portion 77 may be electrically connected with the sensing input signal line 40 through the contact hole 85.

Similarly, the sensing output electrode Rx may also include a thinner portion 66 having a relatively thin width in a portion overlapped with the gate line 121 or the common voltage line 131.

Referring to FIG. 22, the touch sensor have the same connections for sensing input electrodes Tx and sensing output electrode Rx as shown in FIG. 21 except that the sensing input electrode Tx and the sensing output electrode Rx may have different shapes from those of FIG. 21. The sensing input electrode Tx and the sensing output electrode Rx may have shapes according to the exemplary embodiments shown in FIGS. 16 to 19 described above. Even in this case, like the exemplary embodiment shown in FIG. 21 described above, the sensing input electrode Tx includes the thinner portion 77 which is overlapped with the gate line 121 or the common voltage line 131, and the sensing output electrode Rx may include the thinner portion 66 which is overlapped with the gate line 121 or the common voltage line 131.

Hereinafter, a display device including a touch sensor according to an exemplary embodiment of the present invention will be described with reference to FIGS. 23, 24 and 25.

Figure 23:
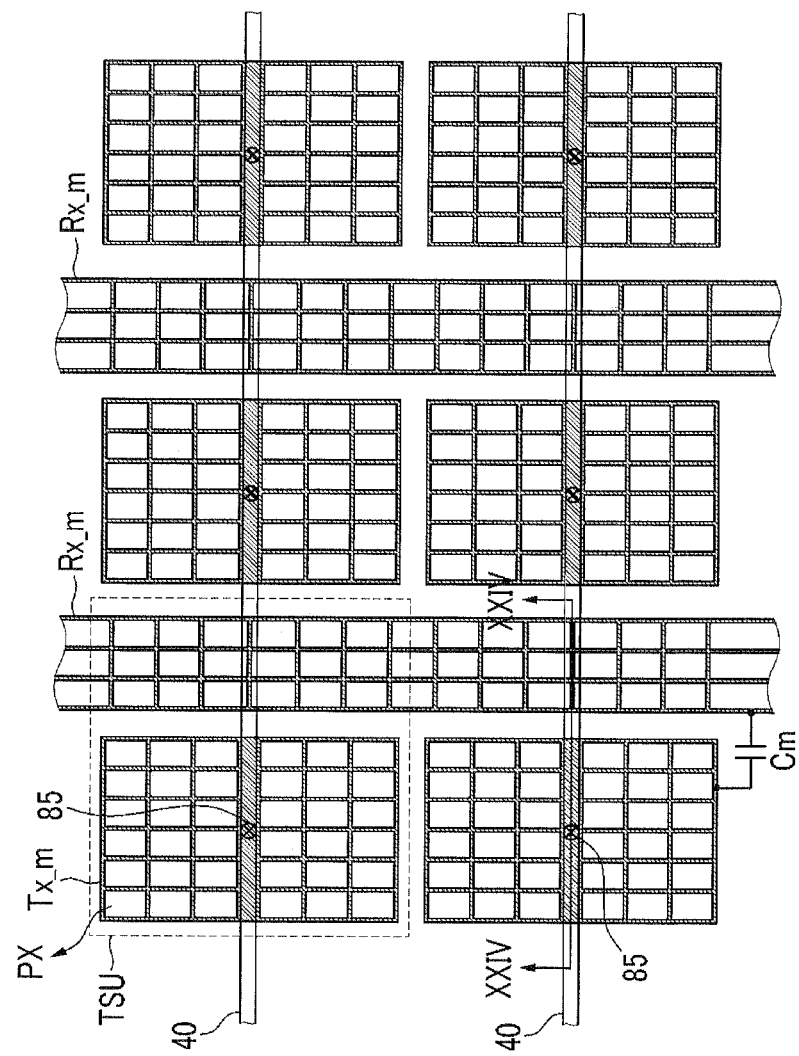
FIG. 23 is a plan view for illustrating a display device including a touch sensor according to an exemplary embodiment of the present invention.
Figure 24:
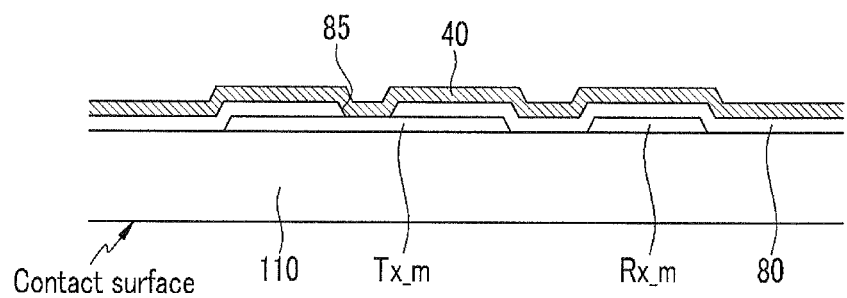
FIG. 24 is a cross-sectional view for illustrating the display device of FIG. 23 taken along line XXIV-XXIV.
Figure 25:
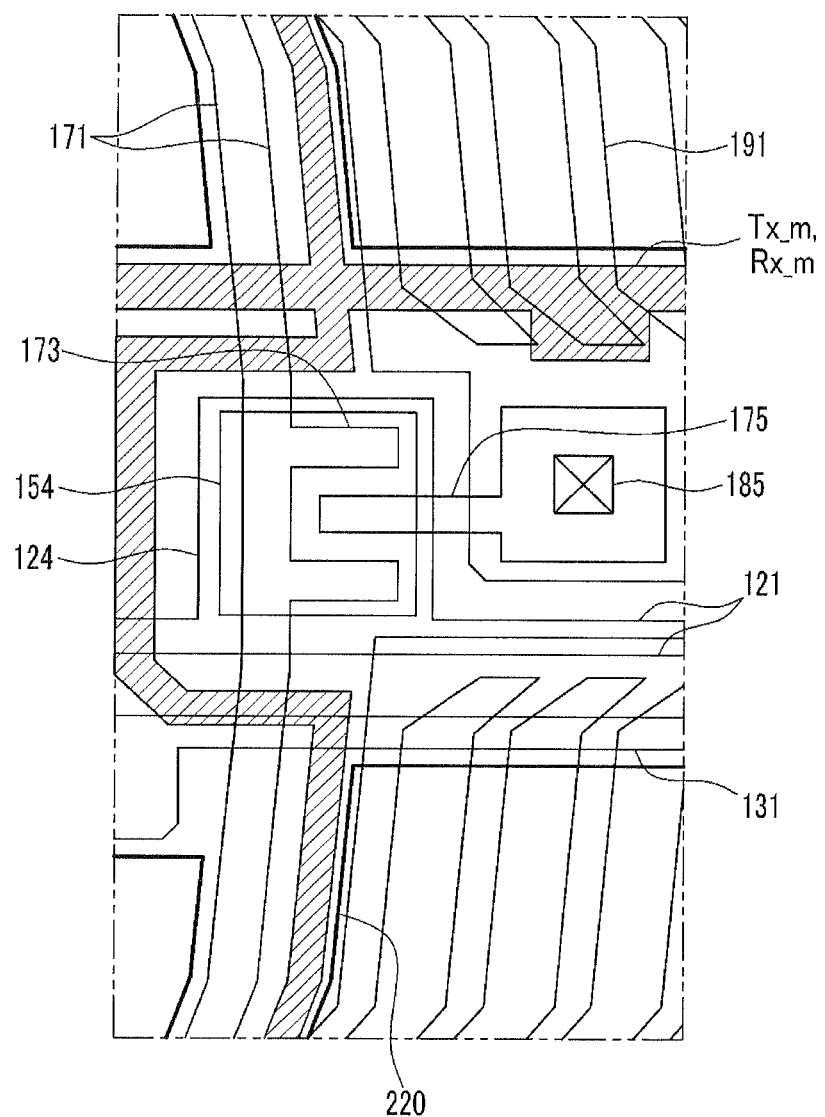
FIG. 25 is a plan view for illustrating a part of the display device including a touch sensor according to the exemplary embodiment of the present invention.

FIG. 23 is a plan view of a display device including a touch sensor according to an exemplary embodiment of the present invention, FIG. 24 is a cross-sectional view showing the display device of FIG. 23 taken along line XXIV-XXIV, and FIG. 25 is a plan view of a part of the display device including a touch sensor according to the exemplary embodiment of the present invention.

Referring to FIG. 23, a display device according to an exemplary embodiment include a sensing input electrode Tx_m and a sensing output electrode Rx_m that are made of conductive materials having low resistance such as metals having lower resistance than ITO and IZO. At least one of the sensing input electrode Tx_m and the sensing output electrode Rx_m may have a mesh shape having a plurality of openings. Although the electrodes Tx_m and Rx_m are opaque, the openings may transmit light. Each opening of the sensing input electrode Tx_m and the sensing output electrode Rx_m may provide a pixel area corresponding to one pixel PX. In one embodiment, the electrodes Tx_m and Rx_m may include a metal material such as copper (Cu).

Referring to FIG. 24, the sensing output electrode Rx_m may transmit sensing output signals due to its low resistance, and as a result the sensing output electrode Rx_m may be directly connected with the sensing signal processor 800. In other words, the sensing output signal line 50 may be omitted as compared with the embodiment illustrated in FIG. 9. The sensing input signal line 40 is electrically connected with the sensing input electrode Tx_m which is contacted through the contact hole 85 of the insulating layer 80, thereby further reducing the signal delay of the sensing input signal.

Similarly, the sensing input electrode Tx_m may transmit sensing input signals, eliminating sensing input signal lines 40. The sensing input electrode Tx_m may be directly connected with the sensing scan driver 400T. When sensing input electrodes Tx_m and sensing output electrode Rx_ms are made of the low-resistance materials such as metal, signal delay of sensing input signals and sensing output signals is reduced so that accurate contact information may be obtained without using dual signal lines of sensing output signal lines and sensing input signal lines. The structure of a touch sensor TSU without using dual signal lines may simplify the process of manufacturing a touch sensor TSU.

Referring to FIG. 25, the display device according to the exemplary embodiment of the present invention includes a sensing input electrode Tx and a sensing output electrode Rx which are positioned on an insulation substrate (not shown). The sensing input electrode Tx and the sensing output electrode Rx may be made of opaque conductive materials such as metals.

A gate line 121 and a data line 171 may cross each other on the insulation substrate. The gate line 121 includes a gate electrode 124, and the data line 171 may include a source electrode 173 protruding toward the gate electrode 124.

A gate insulating layer (not shown) is positioned on the gate line 121, and a semiconductor 154 is positioned to overlap with the gate electrode 124. A drain electrode 175 may be positioned on the semiconductor 154, facing the source electrode 173 based on the gate electrode 124.

A passivation layer (not shown) including a contact hole 185 which exposes the drain electrode 175 is positioned on the source electrode 173 and the drain electrode 175, and a pixel electrode 191 which is electrically connected with the drain electrode 175 in the contact hole 185 may be positioned on the passivation layer 180.

Further, a common voltage line 131 transmitting common voltage Vcom may be positioned on the insulation substrate 110. In addition, many elements shown in FIG. 25 may have the same feature as the elements represented by like reference numerals in the exemplary embodiments described above.

As shown in FIG. 25, the sensing input electrode Tx_m and the sensing output electrode Rx_m may include a portion parallel to the data line 171 or the gate line 121, positioning at a portion covered by the light blocking member 220 together with the data line 171 and the gate line 121.

However, in the case where the sensing input electrode Tx_m and the sensing output electrode Rx_m are positioned directly on the second surface which is an opposite surface of the contact surface (the first surface) of the insulation substrate 110, external-light reflection occurs on the surfaces of the sensing input electrode Tx_m and the sensing output electrode Rx_m and thus a surface reflectance increases, thereby deteriorating display quality. In this case, the external-light reflection may not be recognized from the outside by a separate light blocking means. The example will be described with reference to FIGS. 26, 27, 28 and 29.

FIGS. 26, 27, 28 and 29 are cross-sectional views for illustrating a display device including a touch sensor according to an exemplary embodiment of the present invention, respectively.

Figure 26:
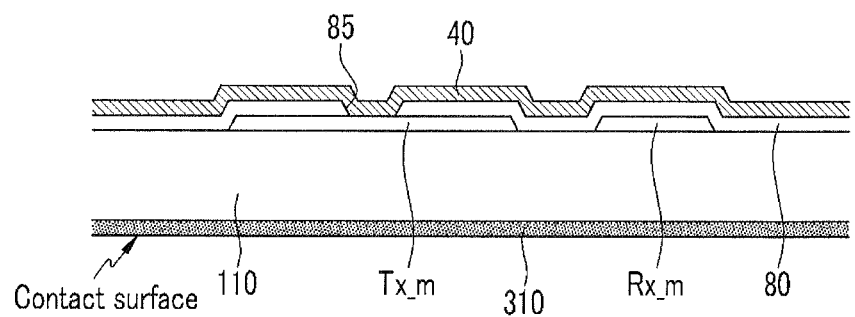
FIGS. 26, 27, 28, 29, 30, 31, 32 and 33 are cross-sectional views for illustrating a display device including a touch sensor according to an exemplary embodiment of the present invention, respectively.
Figure 27:
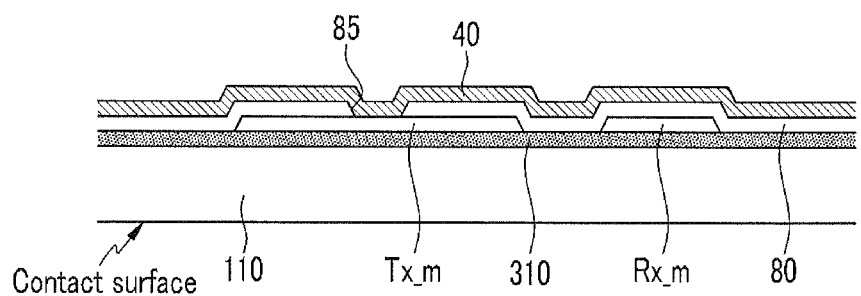

Referring to FIGS. 26 and 27, a touch sensor TSU may include a light blocking layer 310 to reduce external-light reflection from the electrodes Rx_m and Tx_m of FIG. 24. The light blocking layer 310 may cover the sensing input electrodes Tx_m and the sensing output electrodes Rx_m when viewed by an observer. The light blocking layer 310 may include a light blocking material. The light blocking layer 310 may have a planar form capable of covering the sensing input electrode Tx_m and the sensing output electrode Rx_m. When external light goes through the insulation substrate 110 and reflects from the surfaces of the sensing input electrode Tx_m and the sensing output electrode Rx_m, the reflected external light may not go through the light blocking layer 310 and may be almost totally reflected back from the light blocking layer 310. As a result, the light blocking layer 310 may reduce surface reflectance when the electrodes Tx_m and Rx_m are used instead of transparent electrodes such as indium tin oxide (ITO) or indium zinc oxide (IZO).

In FIG. 26, the light blocking means 310 is positioned on the contact surface of the insulation substrate 110. In FIG. 27, the light blocking layer 310 is positioned on an opposite surface (second surface) to the contact surface (first surface) of the insulation substrate 110. Referring to FIG. 27, the light blocking layer 310 may be positioned between the insulation substrate 110 and the sensing input electrode Tx_m and sensing output electrode Rx_m.

Figure 28:
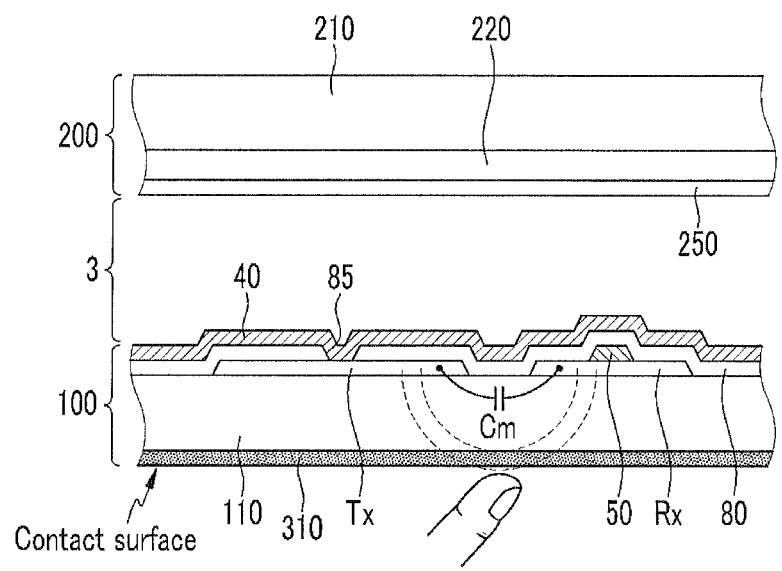

Referring to FIG. 28, the display device according to the exemplary embodiment may include an upper panel 200, a liquid crystal layer 3 and the lower panel 100 of FIG. 26. The upper panel 200 may be disposed over the lower panel 100, and the liquid crystal layer 3 may be disposed between the panels 100, 200. The lower panel 100 has the same structure with that of FIG. 26. The upper panel 200 may include a light blocking member 220 and an overcoat layer 250 positioned on the insulation substrate 210. The light blocking member 220 may have a portion overlapped with the light blocking layer 310.

Figure 29:
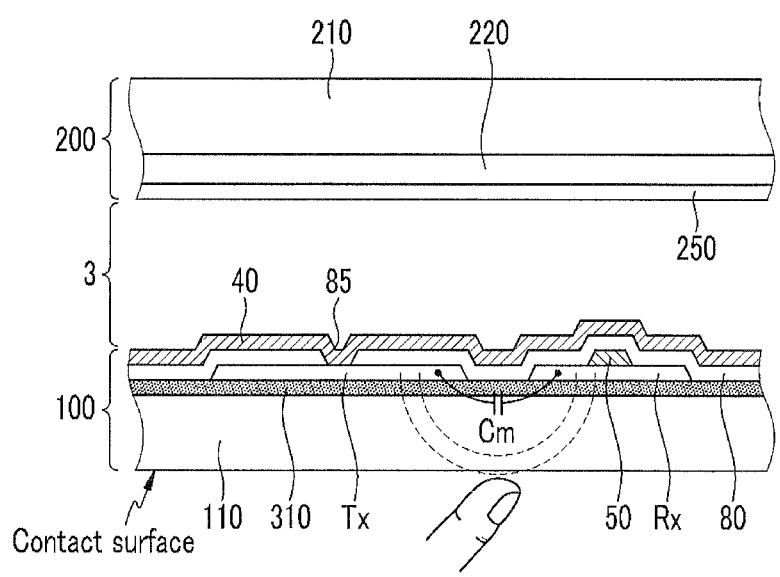

Referring to FIG. 29, the display device according to the exemplary embodiment may include an upper panel 200, a liquid crystal layer 3 and the lower panel 100 of FIG. 27. The display device may have the same structure with that of FIG. 28 except that the lower panel 100 has the structure of FIG. 27.

Hereinafter, the display device according to the exemplary embodiment of the present invention will be described with reference to FIGS. 30, 31, 32 and 33.

Figure 30:
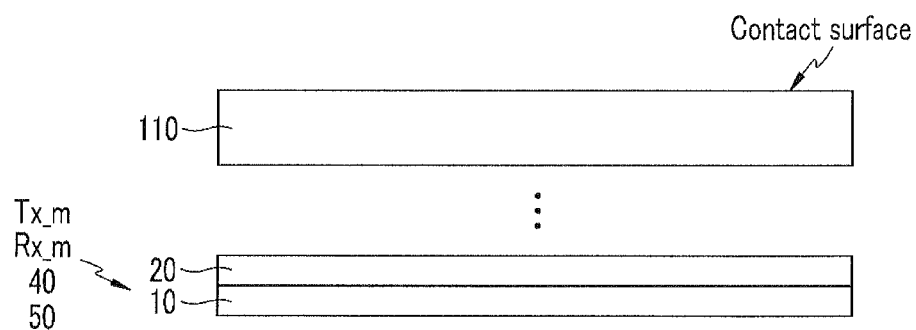
Figure 31:
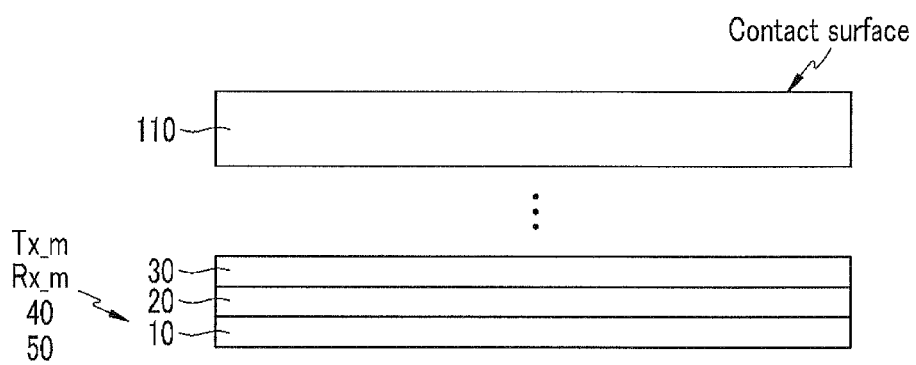
Figure 32:
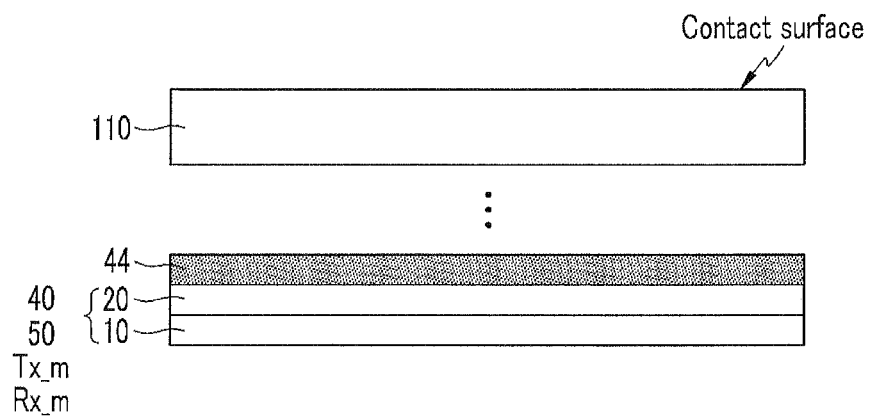

FIGS. 30, 31, 32 and 32 are cross-sectional views for illustrating a lower panel 100 of the display device including a touch sensor according to the exemplary embodiment of the present invention, respectively.

Referring to FIG. 30, a lower panel 100 may have a two-layered structure of at least one of the sensing input signal lines 40, the sensing output signal lines 50, the sensing input electrodes Tx_m and the sensing output electrodes Rx_m. The multi-layered structure may include a first layer 10 and a second layer 20. The first layer 10 and the second layer 20 may be made of different conductive materials. For example, the first layer 10 includes copper (Cu), and the second layer 20 includes titanium (Ti), thereby reducing reflection of external light.

Referring to FIG. 31, a lower panel 100 may have a three-layered structure of at least one of the sensing input signal line 40, the sensing output signal line 50, the sensing input electrode Tx_m and the sensing output electrode Rx_m. The three-layered structure may include a first layer 10, a second layer 20 and a third layer 30. The three layers 10, 20, 30 may be made of at least two different conductive materials. For example, the first layer 10 and the third layer 30 include molybdenum (Mo), the second layer 20 include aluminum (Al), thereby reducing reflection of external light which may occur on at least one surface of the sensing input signal line 40, the sensing output signal line 50, the sensing input electrode Tx_m and the sensing output electrode Rx_m.

Figure 33:
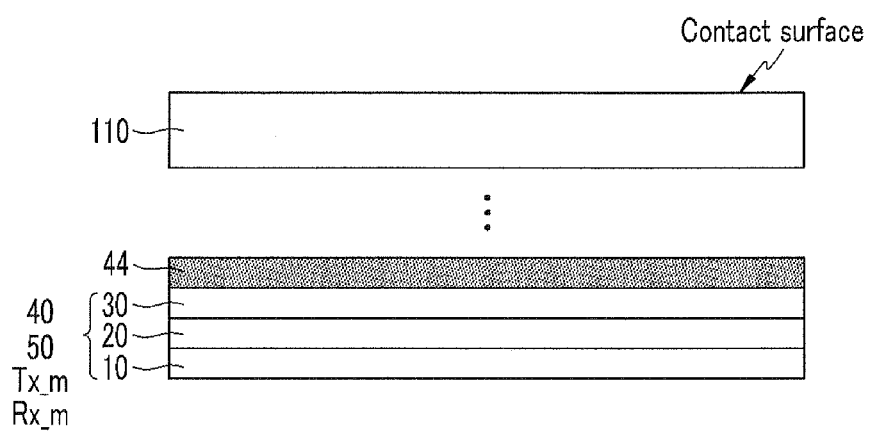

Referring to FIGS. 32 and 33, a lower panel may include an anti-reflective layer 44. The lower panel 100 of FIG. 32 may have the same structure with that of FIG. 30 except that the lower panel 100 further includes the anti-reflective layer 44 positioned between an insulation substrate 110 and at least one of the sensing input signal line 40, the sensing output signal line 50, the sensing input electrode Tx_m and the sensing output electrode Rx_m. The anti-reflective layer 44 may prevent external light from being reflected on at least one surface of the sensing input signal line 40, the sensing output signal line 50, the sensing input electrode Tx_m and the sensing output electrode Rx_m. The anti-reflective layer 44 may include an anti-reflective material such as CuNx, TiOx, and SiNx. In FIG. 32, the lower panel 100 may have an anti-reflective layer 44 disposed between an insulation substrate 110 and a three-layered layer of at least one of the sensing input signal line 40, the sensing output signal line 50, the sensing input electrode Tx_m and the sensing output electrode Rx_m as shown in FIG. 31.

Alternatively, an anti-reflective layer 44 may be formed on a single layered structure of a sensing input signal line 40, a sensing output signal line 50, a sensing input electrode Tx_m and a sensing output electrode Rx_m.

Further, an anti-reflective layer 44 may be positioned between multilayers included in the sensing input signal line 40, the sensing output signal line 50, the sensing input electrode Tx_m and the sensing output electrode Rx_m. For example, in the exemplary embodiment shown in FIG. 32, the anti-reflective layer 44 may be positioned between the first layer 10 and the second layer 20. That is, the anti-reflective layer 44 according to the exemplary embodiment of the present invention may be positioned between a surface which is far away from the insulation substrate 110 among surfaces of the sensing input signal line 40, the sensing output signal line 50, the sensing input electrode Tx_m and the sensing output electrode Rx_m and the second surface of the insulation substrate 110.

The exemplary embodiments of the present invention are not limited to the display devices which are shown in the drawings or described above and may be equally applied to various display devices.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

| | |
|---|---|
| 3: Liquid crystal layer | 12, 22: Polarizer |
| 13: Tempered glass | 40: Sensing input signal line |
| 50: Sensing output signal line DeletedTexts | 85, 87, 183, 185: Contact hole |
| 100, 200, 300: Display panel DeletedTexts | 110, 210: Insulation substrate |
| 121: Gate line | 131: Common voltage line |
| 140: Gate insulating layer | 180: Passivation layer |
| 191: Pixel electrode | 220: Light blocking member |
| 230: Color filter | 250: Overcoat layer |
| 270: Opposed electrode | 271: Common electrode |
| 310: Light blocking means | 330: Partition |
| 370: Organic light emitting member | 390: Encapsulation layer |
| 400T, 400D: Scan driver | 500: Data driver |
| 600: Signal controller | 800: Sensing signal processor |

What is claimed is:

1. A display device, comprising:
   a substrate having a first surface and a second surface;
   a sensing capacitor having a first sensing electrode and a second sensing electrode as two terminals of the sensing capacitor, wherein the first sensing electrode and the second sensing electrode are disposed on the second surface;
a first sensing signal line electrically connected with the first sensing electrode;
a second sensing signal line electrically connected with the second sensing electrode;
an insulating layer positioned on the first sensing electrode and the second sensing electrode, wherein the first sensing signal line is positioned on one side of the insulating layer and the second sensing signal line are positioned on the other side of the insulating layer;
a sensing signal processor connected with the first and second sensing signal lines;
a gate line transmitting a gate signal to a pixel, the gate line being positioned on the insulating layer, being adjacent to and substantially parallel to the first sensing signal line,
wherein the sensing signal processor determines whether an external object contacts on the first surface based on a voltage difference of the sensing capacitor,
wherein one of the first and second sensing signal lines transmits a sensing input signal to charge the sensing capacitor, and the other one of the first and second sensing signal lines transmits a sensing output signal from the sensing capacitor, and
wherein the first sensing signal line directly contacts the first sensing electrode everywhere the first sensing signal line overlaps the first sensing electrode, and
wherein at least of the first sensing electrode and the second sensing electrode includes a thinner portion, and only the thinner portion overlaps the gate line in a display area.

2. The display device of claim 1, wherein the first sensing signal line has a lower resistance than the first sensing electrode, and the second sensing signal line has a lower resistance than the second sensing electrode.

3. The display device of claim 1,
wherein the second sensing signal line is connected to the second sensing electrode through a contact hole formed in the insulation layer.

4. The display device of claim 3 wherein the pixel emits light through the first surface.

5. The display device of claim 1,
wherein the second sensing signal line contacts and is electrically connected to the thinner portion.

6. The display device of claim 1, wherein the first sensing signal line comprises a plurality of sub signal lines overlapping the first sensing electrode, and wherein the sub signal lines are substantially parallel to each other.

7. The display device of claim 4,
wherein at least one of the first sensing electrode and the second sensing electrode includes a plurality of sensing electrodes arranged in a column direction and a connection part connecting adjacent sensing electrodes, wherein the connection part has a smaller width than the sensing electrode.

8. The display device of claim 4,
wherein at least one of the first sensing electrode and the second sensing electrode includes a metal, and has a mesh shape having an opening for transmitting light emitting from the pixel.

9. The display device of claim 8, further comprising:
a light blocking layer covering the first sensing electrode and the second sensing electrode.

10. The display device of claim 9, further comprising:
an anti-reflective layer positioned on at least one of the first sensing signal line, the second sensing signal line, the first sensing electrode and the second sensing electrode.

11. The display device of claim 10,
wherein the anti-reflective layer includes at least one of CuNx, TiOx and SiNx.

12. The display device of claim 11, further comprising:
a printed circuit board connected with a display panel having the pixel, the sensing capacitor, the first sensing signal line and the second sensing signal line through a printed circuit film,
wherein the printed circuit film has a flat, rigid film, and contacts a third surface of the display panel and a fourth surface of the printed circuit board, the third surface and the fourth surface facing a same direction.

13. The display device of claim 1,
wherein the sensing signal processor includes a current integrator configured to measure a voltage based on the first amount of charges and the second amount of charges stored in the sensing capacitor.

* * * * *